US008955566B2

(12) United States Patent
Loewe

(10) Patent No.: US 8,955,566 B2
(45) Date of Patent: *Feb. 17, 2015

(54) TIRE PRESSURE MAINTENANCE DEVICE

(76) Inventor: Richard Loewe, Tustin, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/842,874

(22) Filed: Jul. 23, 2010

(65) Prior Publication Data

US 2010/0288411 A1   Nov. 18, 2010

Related U.S. Application Data

(63) Continuation-in-part of application No. 11/711,398, filed on Feb. 27, 2007, now Pat. No. 7,784,513, which is a continuation-in-part of application No. 11/273,116, filed on Nov. 14, 2005, now Pat. No. 7,237,590.

(60) Provisional application No. 60/627,256, filed on Nov. 12, 2004.

(51) Int. Cl.
| | | |
|---|---|---|
| *B60C 23/10* | (2006.01) | |
| *B60C 23/00* | (2006.01) | |
| *B60C 23/04* | (2006.01) | |
| *B60C 23/12* | (2006.01) | |

(52) U.S. Cl.
CPC ............. *B60C 23/004* (2013.01); *B60C 23/043* (2013.01); *B60C 23/12* (2013.01)
USPC .......................................... 152/419; 152/418

(58) Field of Classification Search
USPC ......................................... 152/415, 418–419
See application file for complete search history.

(56) References Cited

U.S. PATENT DOCUMENTS

| | | |
|---|---|---|
| 1,128,455 A | 2/1915 | Keith |
| 1,254,903 A | 1/1918 | Hall |
| 1,744,405 A | 1/1930 | McCord |
| 1,894,908 A | 1/1933 | Hopkins |
| 2,084,381 A | 6/1937 | Campbell |
| 2,211,935 A | 8/1940 | Parker |
| 2,415,618 A | 2/1947 | West |
| 3,452,801 A | 7/1969 | Fletcher |
| 3,971,425 A | 7/1976 | Tsuruta |
| 4,061,200 A | 12/1977 | Thompson |

(Continued)

FOREIGN PATENT DOCUMENTS

| | | |
|---|---|---|
| DE | 1011756 B | 7/1957 |
| JP | 60148705 A | 8/1985 |

OTHER PUBLICATIONS

VisiTyre Reduces Problems for Type Fitters. Nov. 26, 2008. VisiTyre: Eliminates Sensor Damage During Tyre Fitting Procedures. Nov. 26, 2008. <http://www.etv.com.au/Fitters-DC.htm> 4 pages.

(Continued)

*Primary Examiner* — Jason Bellinger
(74) *Attorney, Agent, or Firm* — Stetina Brunda Garred & Brucker

(57) ABSTRACT

A device for maintaining a desired inflation pressure within a tire mounted on a wheel of a vehicle which includes a flexible compression chamber and a magnetic element not on the wheel. As the compressor passes the magnet each wheel revolution, a small amount of atmospheric air is pumped into the tire, if needed. The magnet and the compressor need no other contact with the vehicle or the wheel and require no energy source on the wheel.

37 Claims, 12 Drawing Sheets

(56) References Cited

U.S. PATENT DOCUMENTS

| | | |
|---|---|---|
| 4,157,530 A | 6/1979 | Merz |
| 4,269,252 A | 5/1981 | Shapiro |
| 4,349,064 A | 9/1982 | Booth |
| 4,570,691 A | 2/1986 | Martus |
| 4,651,792 A | 3/1987 | Taylor |
| 4,742,857 A | 5/1988 | Gandhi |
| 4,889,474 A | 12/1989 | Nakajima et al. |
| 5,119,856 A | 6/1992 | Zarotti |
| 5,325,901 A | 7/1994 | Olney |
| 5,325,902 A | 7/1994 | Loewe et al. |
| 5,335,540 A | 8/1994 | Bowler et al. |
| 5,355,924 A | 10/1994 | Olney |
| 5,452,753 A | 9/1995 | Olney |
| 5,472,032 A | 12/1995 | Winston |
| 5,505,080 A | 4/1996 | McGhee |
| 5,556,489 A | 9/1996 | Curlett |
| 5,558,730 A | 9/1996 | Olney et al. |
| 5,591,281 A | 1/1997 | Loewe |
| 5,616,196 A | 4/1997 | Loewe |
| 5,667,606 A | 9/1997 | Renier |
| 5,928,444 A | 7/1999 | Loewe et al. |
| 6,691,754 B1 | 2/2004 | Moore |
| 6,742,386 B1 | 6/2004 | Larson |
| 6,744,356 B2 | 6/2004 | Hamilton |
| 7,237,590 B2 | 7/2007 | Loewe |
| 7,357,164 B2 | 4/2008 | Loewe |
| 7,784,513 B2 | 8/2010 | Loewe |
| 2006/0102268 A1 | 5/2006 | Loewe |
| 2007/0151648 A1 | 7/2007 | Loewe |
| 2008/0135151 A1 | 6/2008 | Loewe |

OTHER PUBLICATIONS

Sample Car Data Graph. <http://www.brightwaterco.uk/lapmovie.html> 1 page.

Tire Pressure Monitoring Systems (TPMS). Nov. 26, 2008. Copyright 2007. Delta Electronics, Inc. <http://www.delta.com.tw/product/ap/tpms/tpms_main.asp> 2 pages.

VisiTyre Technical Overview and Specification. Nov. 26, 2008. VisiTyre Media Reports. <http://www.etv.com.au/Tech_Spec.htm> 3 pages.

VisiTyre System Block Diagram. Nov. 26, 2008. VisiTyre: A TPMS Solution. <http://www.etv.com.au/System_Diagram.htm> 2 pages.

VisiTyre Operational Advantages. Nov. 26, 2008. VisiTyre: A TPMS Solution. <http://www.etv.com.au/Operational_Advantages.htm> 1 page.

TIRE PRESSURE MAINTENANCE DEVICE

CROSS-REFERENCE TO RELATED APPLICATIONS

This application is a continuation-in-part of U.S. application Ser. No. 11/711,398, now U.S. Pat. No. 7,784,513, filed on Feb. 27, 2008 which is a continuation-in-part of U.S. application Ser. No. 11/273,116 now U.S. Pat. No. 7,237,590, filed Nov. 14, 2005, the contents of which are wholly incorporated by reference herein and which claims priority to provisional application Ser. No. 60/627,256 filed on Nov. 12, 2004.

STATEMENT RE: FEDERALLY SPONSORED RESEARCH/DEVELOPMENT

Not Applicable

BACKGROUND

The present invention relates generally to vehicle tire pressure maintenance, and more specifically, to a tire pressure maintenance device contained on a wheel of a vehicle that automatically regulates and maintains a desired tire inflation pressure or amount of air in a tire.

Under-inflation of vehicle tires is dangerous, deadly and common. Under-inflation is involved in hundreds of thousands of accidents, tens of thousands of injuries and hundreds of fatalities annually in the United States. During 2000, a large number of SUV rollovers and deaths were attributed to significantly under-inflated tires, bringing significant attention to the problem. With the hope of reducing the unacceptably high rate of accidents, injuries, and deaths related to under-inflation, the United States Congress passed the TREAD Act of 2000 that requires a warning system in new motor vehicles to indicate to the operator when a tire is significantly underinflated. Consequently, the National Highway Traffic Safety Administration (NHTSA) proposed a safety standard requiring that, as of 2007, all new passenger cars, trucks, multipurpose passenger vehicles, or busses under 10,000 pounds must be equipped with a tire pressure monitoring system (TPMS) to warn a driver when any tire is under-inflated by 25% or more. The program is estimated to cost well over one billion dollars annually.

However, even if the controversial TPMS program achieves its estimates it will reduce under-inflation related accidents by only about twenty percent. Many industry experts doubt that it will help at all. In contrast, a device that automatically maintains proper tire inflation will eliminate almost all accidents, injuries, and deaths due to under-inflation. In addition, an effective tire pressure maintenance device will improve fuel efficiency by about two percent and will reduce tire tread wear by about ten percent. Such benefits will more than pay for the devices and save billions of dollars annually in the United States if implemented into widespread use.

The temperature of air in a tire has a major effect on the pressure of air in the tire. This factor must be considered in any approach to tire pressure maintenance. FIG. 1 shows how tire pressure varies with temperature according to the ideal gas law. The four pressure-temperature (P-T) lines illustrate the pressure-temperature behavior of a tire filled to 32 psi at air temperatures of 20, 40, 60, and 80° F., assuming a constant tire volume. The four P-T lines represent four different amounts of air in the tire. Ambient temperature variations and tire heating from rolling make tire temperatures and pressures move up and down along the P-T line denoting the amount of air in the tire. A tire will move to a higher P-T line only when air is added and to a lower line only when air is released or leaks out of the tire.

As shown in FIG. 1, the pressure in a tire increases and decreases about 1 psi with temperature increases and decreases of 10° F. Normally, the temperature in the tire increases about 2 to 5 psi above its cold pressure at ambient temperature due to the heat caused by flexing of the side walls and friction from road contact as the car is driven. Most under-inflation is due to inadequate manual tire pressure maintenance. The recommended manual tire inflation procedure is to fill each tire monthly to the manufacturer's recommended cold pressure (MRCP) or placard pressure at ambient temperature. In practice, tires are usually filled less often and also while warm from driving. Further, an ambient temperature drop of 50° F., which is possible within a day and common within a month, reduces tire pressure by about 5 psi. Thus, tire pressures frequently fall 8 psi below the MRCP, typically about twenty-five percent, without considering the normal leak rate of about 1 psi per month.

Two approaches to automatic tire pressure maintenance goals are:
1) Constant Pressure by maintaining the MRCP independent of temperature by adding air when the warm tire pressure is below its warm objective, which is about 3 psi above the MRCP; and
2) Constant Amount of Air by maintaining the amount of air in the tire that produces the MRCP at a selected temperature by adding air any time the tire temperature and pressure fall below the related PT line.

Both approaches replace air that leaks from tires and assures less variation from the MRCP than manual inflation procedures, with or without a TPMS. Moreover, the constant amount of air approach will minimize deviations from the PT line due to temperature changes and will minimize the amount of air pumped into a tire to maintain the desired inflation pressure.

Many patents have been granted on approaches to automatically maintain the desired inflation pressure in pneumatic tires. None of these approaches address temperature variation significantly. One such approach involves a difficult generation of two continuous out of phase AC voltages that are rectified to provide a continuous DC power source for a DC motor-driven air compressor on the wheel. Another approach discloses a battery-operated compressor contained on a wheel with no practical means for recharging the battery. Another approach requires a TPMS or an on-wheel pressure sensor to send low tire pressure data from the wheel to the vehicle body in order to activate an electromagnet that drives a compressor on the wheel. However, none of these approaches have produced a practical device. Therefore, there exists a need in the art for a tire pressure maintenance means that:

automatically maintains proper tire inflation without operator attention or maintenance;
    is small, simple, practical, inexpensive and provides long term reliable operation;
    is self-contained on a wheel assembly and operated by wheel rotation;
    is fail safe such that failure does not cause deflation or over-inflation of a tire;
    alerts drivers to excessive tire leaks or failures; and
    provides a higher emergency inflation rate to mitigate leak rates and increase the time for drivers to reach a safe place.

BRIEF SUMMARY

A new device automatically maintains a desired inflation pressure of an interior of a tire mounted on a wheel of a vehicle and overcomes normal car tire leakage. A magnetic element is attached to a stationary part of a wheel assembly and a compressor, such as a microcompressor, is mounted on the rotating wheel. The compressor is magnetically activated as it passes near the magnetic element. The magnetic element, which may be a stationary permanent magnet or electromagnet, may thus be used as the driving element, and several magnetically-driven compressor configurations are disclosed herein. The compressor may perform at least one cycle per wheel revolution. Alternatively, an electrical coil can be mounted on the wheel to pass near the magnetic element, thereby inducing voltage pulses in the coil to provide on-wheel electrical power to run an electrically-driven compressor that is mounted at another location on the wheel.

Various embodiments of the device using a magnetic element include:

1) A stationary permanent magnet that drives an on-wheel magnetically activated compressor.

2) A stationary electromagnet that drives an on-wheel magnetically activated compressor.

3) A stationary permanent magnet and an on-wheel coil that drive an on-wheel electrically activated compressor.

4) A stationary electromagnet and an on-wheel coil that form an intermittent split pulse transformer that transfers electrical power to the wheel to drive an on-wheel electrically activated compressor and exchanges pulse coded data between the wheel and vehicle frame.

As mentioned above, the magnetic element is mounted on the stationary member of the wheel assembly, such as a brake housing, at a radial distance from the axis of rotation of the wheel assembly. The compressor or coil may be mounted on the wheel such that it passes near the magnet during each revolution of the wheel. The magnetic element produces a magnetic field, which creates a magnetic force on the compressor. Additionally, a bias force, which opposes the magnetic force, may be produced by a bias member or source within the compressor. Alternatively, the bias force may be produced centrifugally or by another magnet or pole.

In one embodiment, the compressor comprises a flexible compression chamber and a ferromagnetic actuator that is attached to one end of the chamber. The magnetic force and the bias force cause the ferromagnetic actuator to move back and forth in response to the opposing forces which causes the volume of the compression chamber to sequentially expand and contract. The flexible compression chamber may comprise a bellows having two circular ends and collapsible side walls, where one end of the bellows is fixed in relation to the body of the compressor. Alternatively, the flexible compression chamber may further comprise a flexible diaphragm that bounds the flexible compression chamber on one end. The flexible diaphragm may further comprise ferromagnetic particles dispersed therein. The compressor may further comprise an output valve that is in communication with an output port. The output port may be in fluid communication with an aperture in the rim. Alternatively, a pneumatic tube may connect the output port to the tire's valve stem. When the pressure in the compression chamber exceeds the tire pressure and does not exceed the desired inflation pressure, the output valve opens and compressed air flows into the tire. Thus, the transit of the magnetic field by the compressor causes air to be added to the tire when needed to raise the tire pressure to the desired pressure with no physical contact between the wheel and the vehicle frame for passing power or data.

One of the simplest, smallest embodiments of the present invention uses a stationary permanent magnet and a magnetically activated compressor on the wheel. A magnet in the compressor provides a continuous bias force that holds the flexible compression chamber closed, except when it is overpowered by passing near the magnetic element off the wheel that briefly opens the flexible compression chamber, thus creating the reciprocating motion of the compressor. The force of the magnetic element on the actuator is stronger than that of the bias force. The bias force limits the pressure produced to the desired inflation pressure. The bias force may vary the desired inflation pressure with temperature to match the ideal gas law, thereby regulating the amount of air in the tire to produce the desired inflation pressure at a selected temperature. A compressor that will supply 0.001 to 0.002 cubic inch of free air to a tire each wheel revolution is capable of increasing a normal car tire pressure by 1 psi within 50 to 100 miles of driving, well above normal leakage rates. Such a magnetically-driven compressor may occupy a fraction of a cubic inch and weigh a fraction of an ounce. The device can be added to a Tire Pressure Maintenance System (TPMS) equipped vehicle, but a TPMS may add little value to a vehicle equipped with a device that maintains the desired tire pressure.

An alternative embodiment uses a stationary electromagnet and a rotating electrical coil on the wheel to form an intermittent split pulse transformer briefly during each revolution as the coil passes the stationary electromagnet. The intermittent transformer transfers electrical power from the vehicle to the wheel and provides two-way pulse communication between the vehicle and wheels. The electrical power on the wheel activates an electrically-driven compressor to maintain the desired tire inflation and provides power to on-wheel electronics. An on-wheel electronic controller may manage compressor operation and control two-way communication with a central controller on the vehicle. It may send data on compressor utilization or output flow rate to the central controller from which too high a rate suggests a leak, and too low a rate suggests a device failure. The central controller warns the driver of either such condition by a simple display. Addition of a small rechargeable battery whose charge is maintained by power from the transformer provides reserve power to run the compressor at high speed to mitigate rapid leaks, increasing time to reach safety before the tire goes flat.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 2:
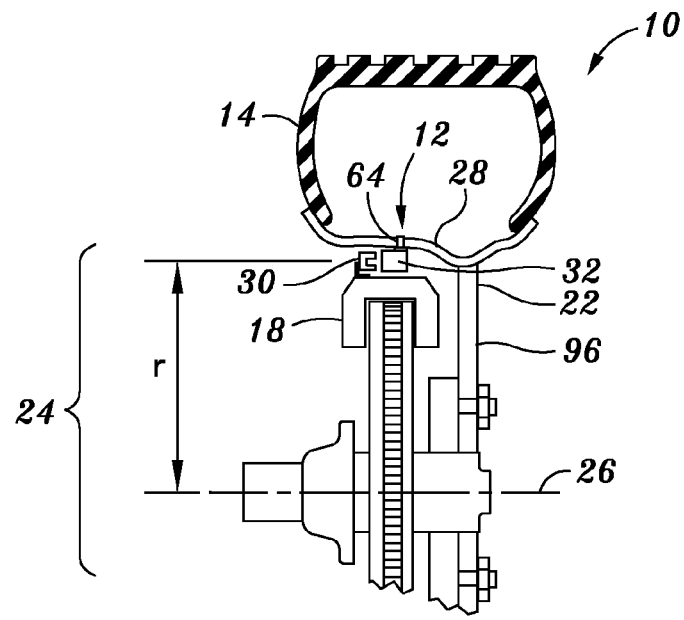
FIG. 2 is a partial cross-section view of an exemplary automobile wheel assembly showing an example location of a magnetic element on a stationary disc brake caliper housing and a magnetically-driven compressor located on a wheel rim at a time when the wheel rotation places them adjacent in accordance with an embodiment of the present invention.

Referring now to the drawings wherein the showings are for purposes of illustrating the various embodiments of the present invention and not for purposes of limiting the same, FIG. 2 is a cross-section view of a partial automobile wheel assembly 10 and a device 12 for maintaining a desired inflation pressure of an interior of a tire 14 by using the rotation of the wheel 22 with respect to the wheel assembly 10. As is known in the art, various configurations exist for wheel assemblies 10. A wheel assembly 10 is generally movably attached to a vehicle frame by a suspension and in some cases, by a steering mechanism. For simplicity, the embodiments of the present invention will be discussed with reference to generic elements that are commonly present in most wheel assemblies 10. However, as will be understood, implementations of the present invention may be retrofitted into a variety of existing wheel assemblies 10 or designed into new wheel assemblies 10 of differing configurations.

Wheel assemblies 10 may include many members that do not rotate with the wheel 22, some of which, such as a brake assembly, retain a very close relationship with the wheel. Such items are referred to hereafter as stationary members, meaning stationary with respect to a wheel assembly 10. Although they may move with respect to the vehicle frame, they do not rotate with the wheel.

Figure 3:
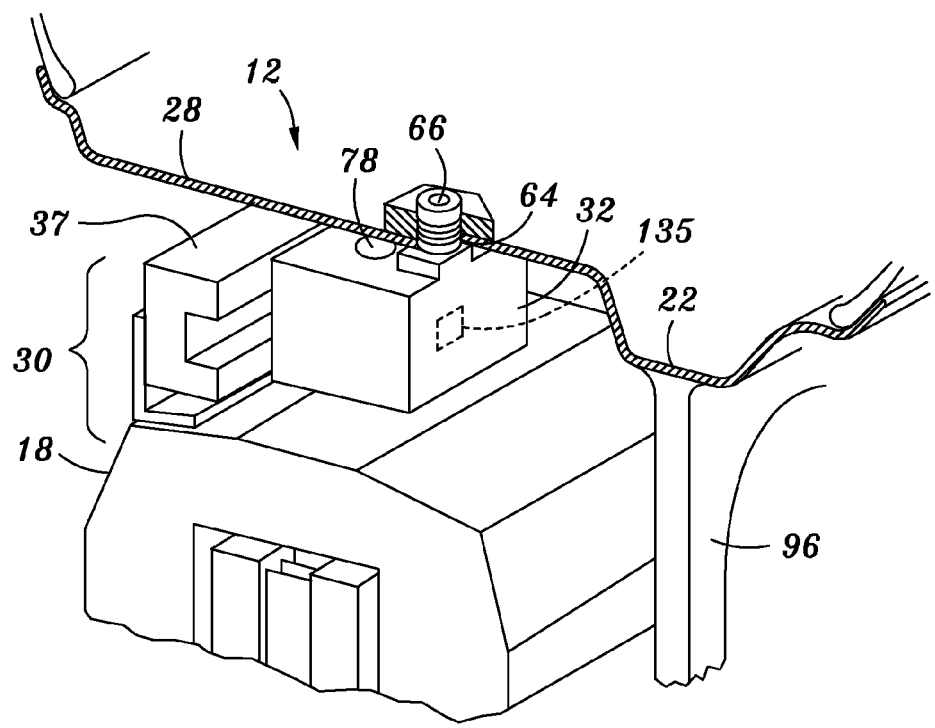
FIG. 3 is an oblique view illustrating the magnetic element and compressor arrangement of FIG. 2 in greater detail.
Figure 4A:
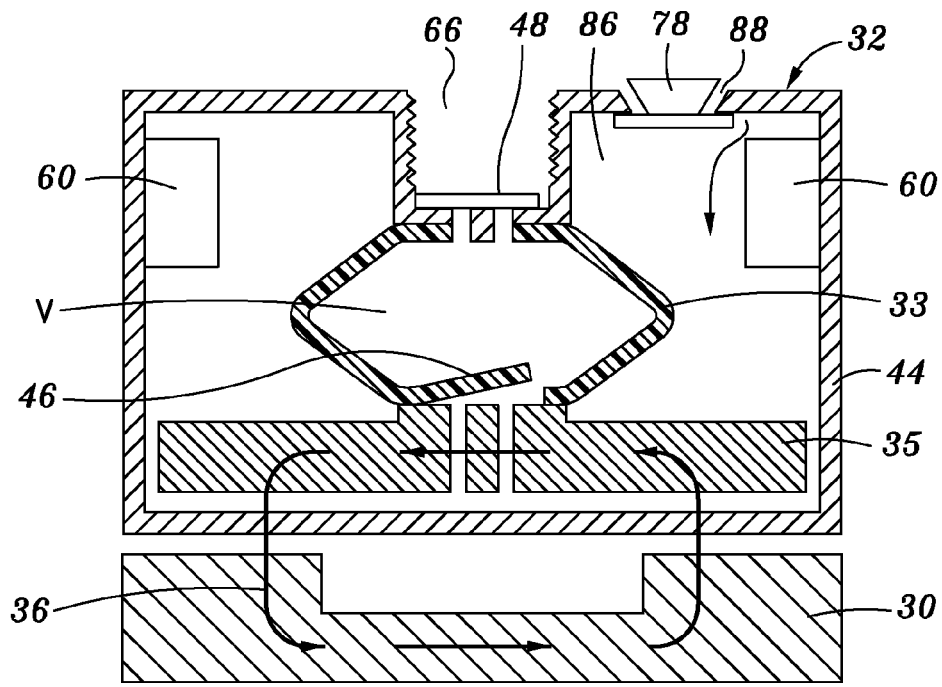
FIG. 4A is a cross-section view of an intake position of a compressor that includes a flexible compression chamber in the form of a bellows, with a magnetic actuator and bias magnets, depicted at a position adjacent to the stationary permanent magnet.
Figure 4B:
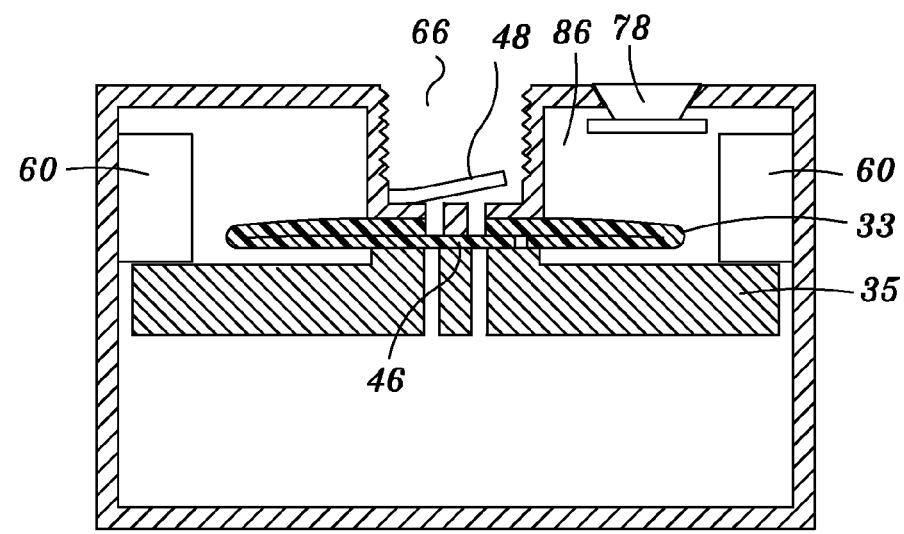
FIG. 4B is a cross-sectional view of an output position of the compressor shown in FIG. 4A.
Figure 5:
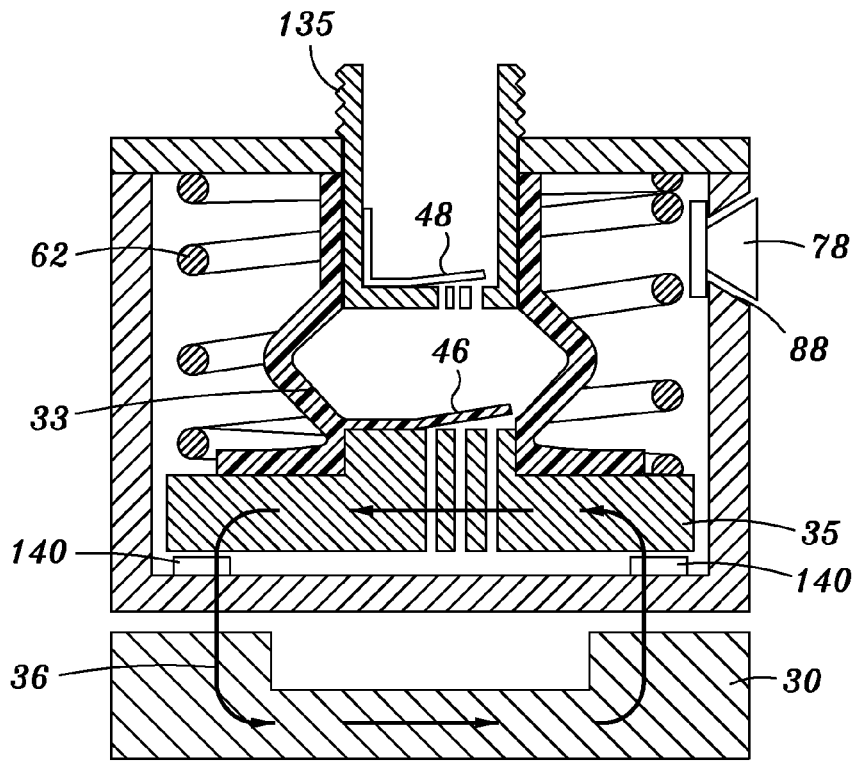
FIG. 5 is a cross-sectional view of another embodiment of a compressor having a flexible compression chamber in which a compression spring provides the bias force.
Figure 7:
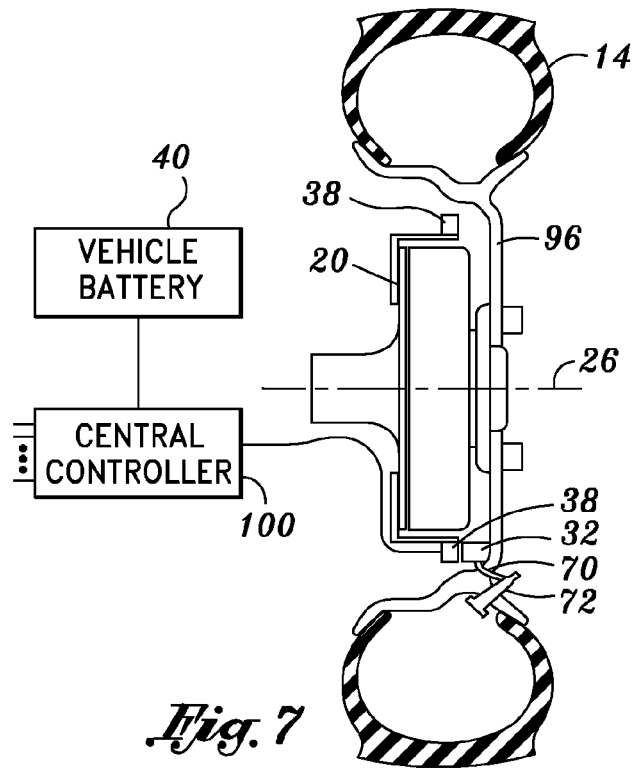
FIG. 7 is a partial cross-section view of another example arrangement on an automobile wheel assembly with a stationary electromagnet and a magnetically-driven compressor wherein the compressor output is connected to a tire valve stem by a pneumatic tube.
Figure 8:
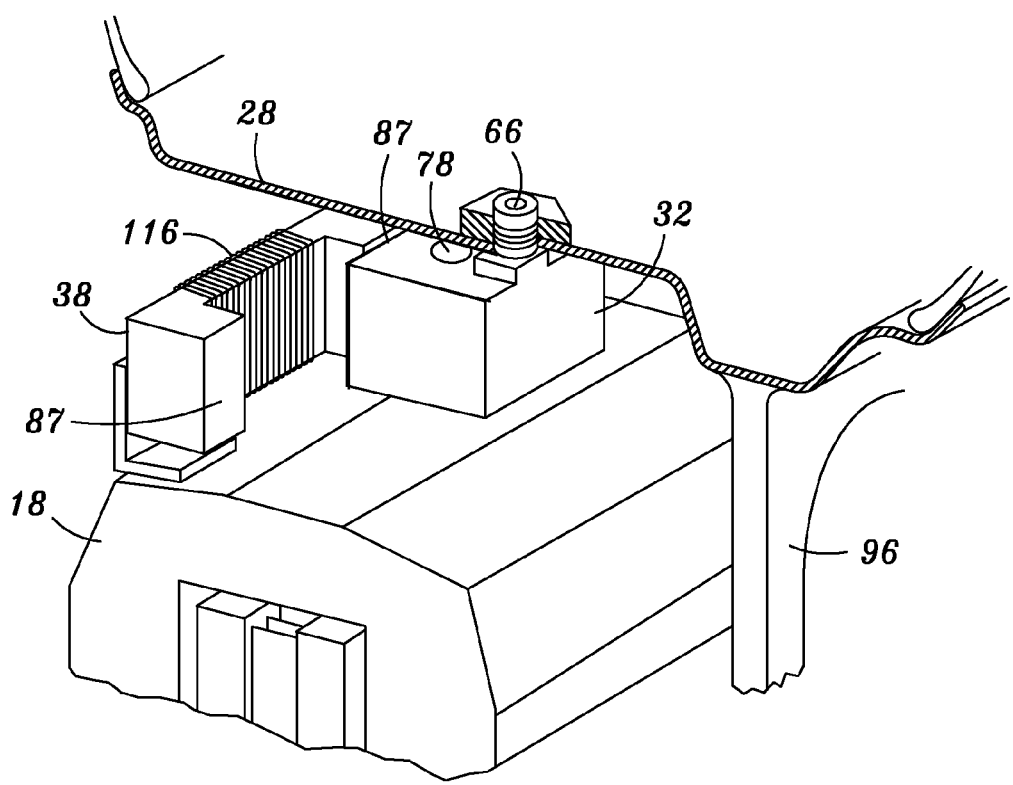
FIG. 8 is an oblique view of a magnetically-driven compressor that is activated by passing each pole of an electromagnet.
Figure 9:
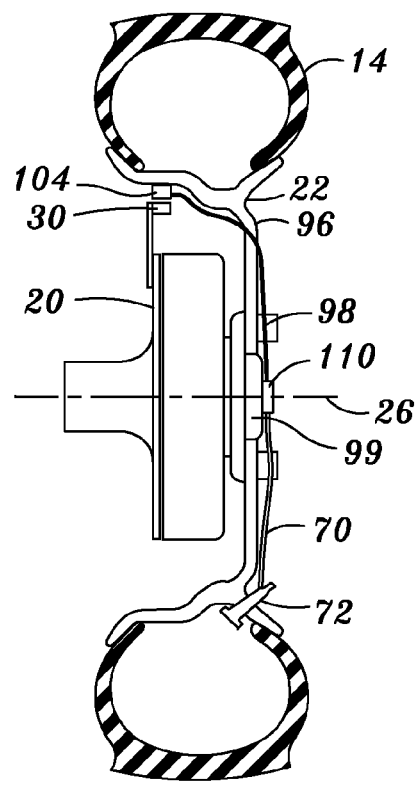
FIG. 9 is a partial cross-section view of an exemplary automobile wheel assembly wherein the stationary permanent magnet is mounted on a drum brake backing plate of the wheel assembly where an electrical coil, mounted on a wheel rim, passes close to the magnetic element and is in electrical communication with an electrically-driven compressor located over a wheel hub and in fluid communication with the valve stem via the pneumatic tube.
Figure 10:
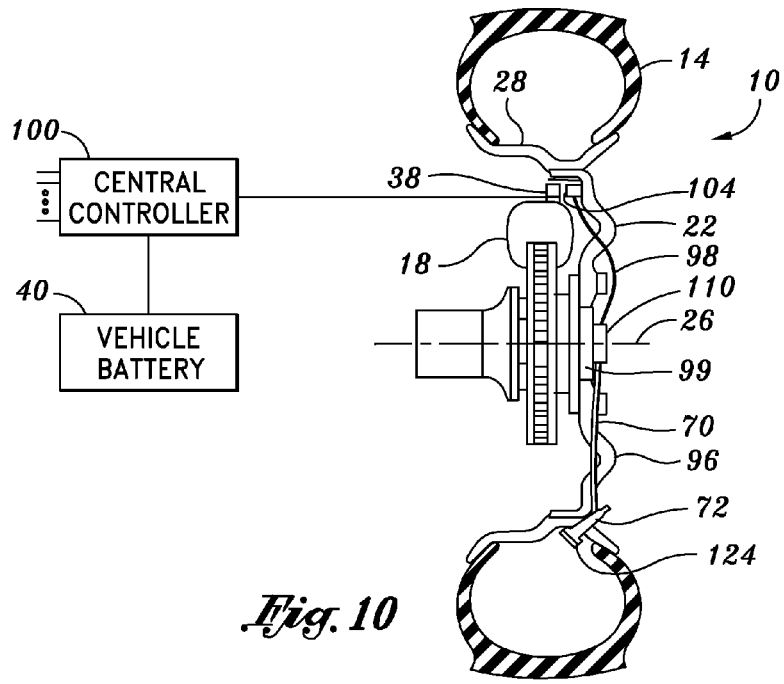
FIG. 10 is a cross-section view of a partial automobile wheel assembly with an electromagnet mounted on a disc brake caliper housing and an electrical coil mounted on a wheel spoke thereby forming an intermittent split transformer for transferring electrical power from the vehicle to the wheel and for communicating between the wheel and a central controller on the vehicle.

Examples of magnetic elements in association with a magnetically driven compressor having a flexible compression chamber are shown in FIGS. 4, 5, and 6 with examples of mounting configurations in FIGS. 2, 3, 7, 8 and 9. These figures are generally schematic illustrations of concepts rather than realistic design illustrations. For simplicity, filters and means to vary the desired inflation pressure with temperature are not shown in all cases, although they are contemplated. In most embodiments the compressor may be mounted to the wheel rim 28 as shown in FIGS. 2, 3 and 8 or to a wheel spoke 96 as shown in FIGS. 7 and 9. Compressor output may be by a direct penetration of the rim 28 by attaching the output port 66 through a hole 64 in the rim as shown in FIGS. 2, 3 and 8 or by pneumatic tube 70 to the wheel's valve stem 72 as shown in FIGS. 7, 9 and 10. The magnetic element 30 may be attached to the brake housing 18 as shown in FIG. 2 or any other stationary member of the wheel assembly 10 where the compressor 32 can be mounted to pass close to it. The shapes and sizes of magnetic members may assume many varied configurations. Different biasing means may be utilized such as centrifugal force, a magnet or a spring for the biasing force. Other such means are described in U.S. patent application Ser. No. 11/273,116, now U.S. Pat No. 7,237,590, which was filed on Nov. 24, 2005, and is hereby incorporated by reference in its entirety for all purposes.

As shown in FIG. 2, the wheel assembly 10 may include a stationary member such as a disc brake caliper housing 18 or a drum brake backing plate 20, as shown in FIG. 7, as well as any other of a variety of stationary members of a wheel assembly 10. Further, FIGS. 2 and 3 also illustrate that the wheel assembly 10 includes a wheel 22 that defines an interior portion 24 and an axis of rotation 26. It is contemplated that the interior portion 24 of the wheel 22 may refer to numerous locations along the wheel 22, such as a wheel rim 28 or a wheel spoke 96. The tire inflation device 12 comprises at least one stationary magnetic element 30 and a compressor 32 that rotates with the wheel 22. The magnetic element 30 can be mounted on a stationary member at a radial distance r from the axis of rotation 26. According to an embodiment of the present invention, such as the embodiment shown in FIG. 4, the magnetic element 30 is operative to produce a magnetic field 36 that the magnetically-driven compressor 32 transits once per wheel revolution. The magnetic element 30 may be a stationary permanent magnet 37 or an electromagnet 38. The magnetic element 30 may further be powered by receiving a current from a power source.

The compressor 32 is mounted on the interior portion 24 of the wheel 22. Thus, as the wheel 22 rotates relative to the stationary member of the wheel assembly 10, the compressor 32 transits the magnetic field 36 during each revolution of the wheel 22. In response to the presence of the magnetic field 36, the compressor 32 operates to maintain the desired inflation pressure within the tire 14 by intaking air from the atmosphere, compressing the air, and outputting the air into the tire 14, when needed. Thus, the compressor 32 is in fluid communication with both of the atmosphere and the tire 14. The compressor 32, which may be a magnetic compressor, further includes a compressor body 44. FIGS. 2 and 3 further illustrate the relationship of the compressor 32 with respect to the magnetic element 30 as the compressor 32 transits the magnetic field, as shown in FIG. 4A. The magnetic element 30 and the compressor 32 are disposed at approximately the same radial distance r from the axis of rotation 26. The compressor 32 is positioned to pass close to the magnetic element 30 during each rotation of the wheel 22. It is contemplated that various modifications to the general configuration may be implemented so as to further enhance the magnetic communication of the magnetic element 30 and the compressor 32 and to facilitate mounting on various wheel assemblies 10.

In addition to the features already mentioned, the device 12 further includes means for regulating output pressure of the compressed air to the desired inflation pressure. As will be noted further below, the regulation of the output pressure of the compressed air may be accomplished without off-wheel aid. Thus, embodiments of the present invention may operate independent of controllers, regulators, or other devices and provide an independent, self-sufficient device that maintains the desired inflation pressure within the tire 14 without any outside source of power or data being attached to the wheel.

Referring now to FIGS. 4A, there is illustrated a cross-section view of a magnetic element 30 and the compressor 32 as the compressor 32 transits the magnetic field 36. In the embodiment shown in FIGS. 4A and 4B, the compressor 32 includes a flexible compression chamber 33 and an actuator 35. The flexible compression chamber 33 is collapsible in that it defines a chamber volume v, which chamber volume v may be increased or decreased by the action of the actuator 35. The flexible compression chamber 33 may be in the form of bellows, such as shown in FIGS. 4A and 4B, or the flexible compression chamber 33 may comprise any similar structure that defines a chamber volume that is collapsible in response to the transit of the magnetic field 36 by the compressor 32. The bellows may have two circular ends, each end may be in communication with the collapsible sidewalls, one end may contain an input valve and the other end may contain an output valve, as further described herein, and collapsible sidewalls. The input valve and the output valve may further be incorporated into the bellows. Preferably one end of the flexible compression chamber 33 is fixed in relation to one end of the body of the compressor. As with any flexible material that is constantly flexed, the flexible compression chamber 33 may be subject to fatigue. Thus, the flexible compression chamber 33 should be constructed from a durable material that is capable of withstanding factors including heat and constant motion.

The actuator 35 may be ferromagnetic such that it is responsive to magnetic forces. Accordingly, at least one of the two opposing forces is caused by the magnetic element 30, which may be a stationary permanent magnet. The compressor 32 further requires no connected power source for its operation. Alternatively, the magnetic element 30 may be an electromagnet that may be energized while the compressor is transiting its field. Generally, the ferromagnetic actuator 35 is attached to one end of the flexible compression chamber 33 and moves back and forth with respect to the opposite end of the flexible compression chamber 33 in response to alternating opposing forces. The actuator 35 is slidably positionable with respect to the flexible compression chamber 33 to reciprocate between an input position, as shown in FIG. 4A and an output position, as shown in FIG. 4B. This action sequentially expands and contracts the volume of the flexible compression chamber 33.

As the compressor 32 passes the magnetic element 30, it passes through the magnetic flux which follows the path of the magnetic field 36 as shown by the arrows. It should be noted that the magnetic field 36, which is well-known in the art as being a three-dimensional phenomenon, is represented by the two dimensional magnetic flux path shown in the Figures. The magnetic element 30 may be wider than the compressor 32 in the direction of relative motion to lengthen the time that the full magnetic force is applied to the compressor 32 as it transits the magnetic field, as indicated in FIG. 3.

The compressor 32 may include an intake valve 46, an output valve 48, a centrifugal valve 78, an intake plenum 86, and an intake port 88. The intake port 88 and the centrifugal valve 78 are operative to intake air into the compressor 32. The compressor 32 utilizes the intake and output valves 46, 48 to maintain the desired inflation pressure of the tire 14. Specifically, the intake valve 46 is preferably a one-way check valve that is operative to intake air into the compression chamber 33 during the intake or expansion stroke. The output valve 48 is preferably also a one-way check valve that is operative to output air from the compression chamber 33 into the output port 66 during the output or compression stroke. The output valve 48 is further in fluid communication with the tire 14. The intake and output valves 46, 48 are preferably check valves to insure that no air from the tire 14 escapes to the atmosphere. Further, when the flexible compression chamber 33 is expelling air into the tire 14, the intake check valve 46 may insure that no air intended for the tire 14 exits through the intake valve 46.

Referring still to FIGS. 4A and 4B, the air path through the compressor 32 begins at the centrifugal valve 78 at the intake port 88. A bias magnet 60 holds the centrifugal valve 78 closed at vehicle speeds below a predetermined speed, for example 15 miles per hour, at which the centrifugal force expels potential liquid or solid contaminants from the area of the intake port 88, preventing their entry through the centrifugal valve 78. Above the predetermined speed, the centrifugal force on the centrifugal valve 78 overcomes the magnetic bias force holding the centrifugal valve 78 closed and opens the centrifugal valve 78 to allow clean air to enter the intake plenum 86. The compressor body 44 around the centrifugal valve 78 may be shaped to modify the air flow to deflect airborne particles away and reduce pressure differences due to the Bernoulli Effect. The intake plenum 86 may occupy unused space within the compressor body 44. An air filter and a membrane that resists liquid passage may be placed in the intake plenum 86 in the path between the centrifugal valve 78 and the intake valve 46.

As shown in FIG. 4B, two bias magnets 60 apply a bias force on the ferromagnetic actuator 35 to hold it in the output position while the compressor 32 is not in the magnetic field 36 of the magnetic element 30, which minimizes the volume of the flexible compression chamber 33. An intake stroke of the actuator 35 may occur as the compressor 32 transits the magnetic field 36 and the magnetic field 36 acts on the actuator 35 to draw one end of the flexible compression chamber 33 away from its opposite and fixed end. Specifically, when the compressor 32 rotates to the position adjacent the magnetic element 30, the magnetic force applied by the magnetic element 30 on the actuator 35 overpowers the bias force and pulls the actuator 35 out on the intake stroke, maximizing the chamber volume of the flexible compression chamber 33, as shown in FIG. 4A. The outward movement of the actuator 35 increases the chamber volume of the flexible compression chamber 33 and creates a partial vacuum in the flexible compression chamber 33 that opens the intake valve 46 and draws air in from the intake plenum 86. As the compressor 32 passes the magnetic element 30 the magnetic flux follows the path of the magnetic field 36, as shown by the arrows in FIG. 4, through the air gaps, the ferromagnetic actuator 35 and the magnetic element 30. The intake position is achieved when the actuator 35 is positioned such that the flexible compression chamber 33 has substantially a maximum chamber volume.

The actuator 35 is further operative to expel air from the flexible compression chamber 33 into the tire 14 by way of the output valve 48 as the actuator 35 moves toward an output position during an output stroke, in which the actuator 35 is positioned with the flexible compression chamber 33 substantially having a minimum chamber volume. Thus, as the compressor 32 completes its transit of the magnetic element 30, the bias force of the bias magnets 60 on the actuator 35 returns the actuator 35 to an output position on an output stroke. The output stroke is performed when the actuator 35 is pulled away from its open position which reduces the chamber volume of the flexible compression chamber 33 and causes the air within the flexible compression chamber 33 to be compressed increasing its pressure. If the maximum pressure provided by the bias force is less than the tire pressure that appears in the output port 66 the output valve 48 remains closed and no air is forced into the tire 14. If the pressure created in the flexible compression chamber 33 by the bias force exceeds the tire pressure, the output valve 48 opens and air flows into the output port 66 and tire 14.

The compressed air may enter the tire 14 from the output port 66 through fluid communication with an aperture 64 of the rim 28, as shown in FIGS. 2 and 3. Alternatively a pneumatic tube 70 may connect the output port 66 to a valve stem 72, as shown in FIG. 6, such that the output port 66 maintains the same air pressure as the tire. As shown in FIGS. 4A and 4B, the intake and output valves 46, 48 may provide two one-way check valves that prevent air from flowing backwards from the tire 14 through the compressor 32 in the event of a valve failure in the open position. The compressor 32 may further comprise an additional check valve that is positioned between the output valve 48 and the valve stem 72 to prevent air from leaking out of the tire. The magnetic element may be either an electromagnet or a stationary permanent magnet.

Although it is preferred that the magnetic element 30 drive the input stroke and the bias member 60 drive the output stroke, it is contemplated that the magnetic element 30 may drive the output stroke and that the bias force may drive the input stroke of the actuator 35.

Figure 1:
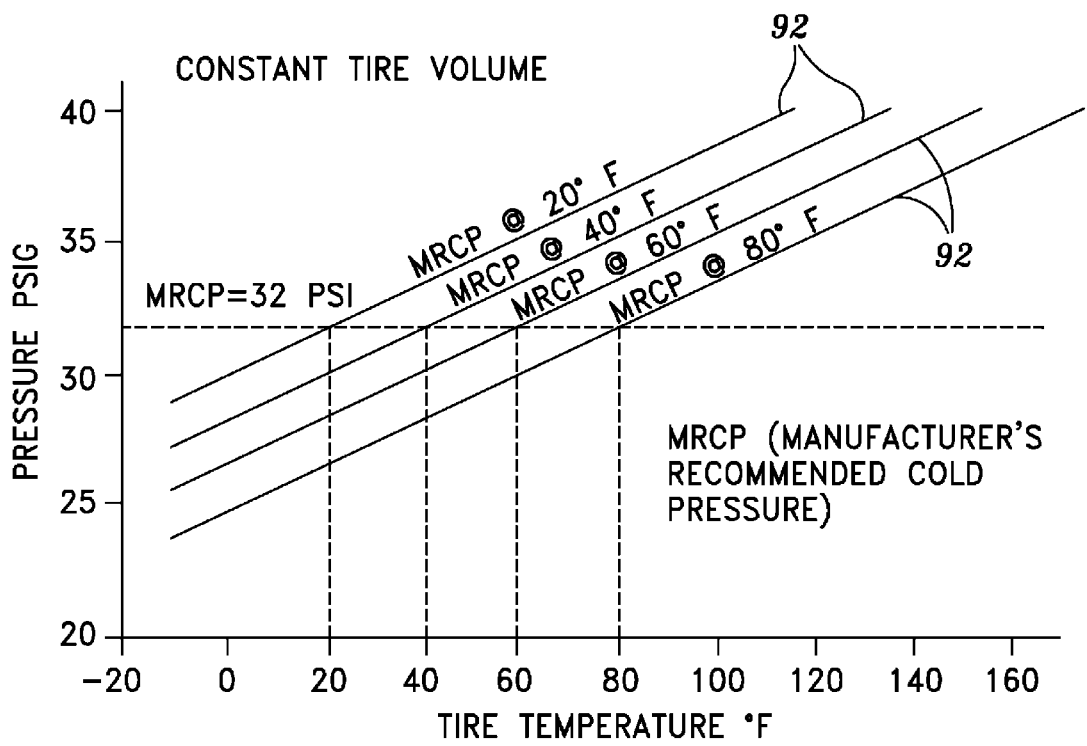
FIG. 1 is a graph showing the relationship of air pressure and temperature along pressure-temperature lines in a tire filled with four different amounts of air to the manufacturer's recommended cold pressure (MRCP) at different temperatures.

Two alternative approaches to tire safety may be followed utilizing embodiments of the present invention. First, one may seek to fix the desired inflation pressure at the MRCP or other constant pressure as desired. As such, the compressor 32 may be required to add air to the tire 14 to compensate for pressure losses due to leaks or drops in the ambient temperature. As an alternative to the fixed constant pressure approach, one may seek to maintain constant the amount of air in the tire 14. Specifically, one may seek to maintain constant the mass of air particles in the tire 14. For example, the compressor 32 may vary the bias force with temperature to make the desired inflation pressure approximate a selected P-T line 92 in FIG. 1. This is achieved by maintaining a constant ratio of absolute pressure to absolute temperature in the tire. This maintains the amount (mass) of air in the tire 14 constant at the amount of air that produces the MRCP at the chosen average ambient temperature several psi above the MRCP. Each P-T line 92 in FIG. 1 represents the P-T relationship of a specific amount of air in the tire 14 according to the ideal gas law (PV=nRT), assuming constant volume. For example, the compressor 32 may be configured to follow the P-T line 92 that intersects the horizontal MRCP 32 psi line at 60° F. That line becomes the desired P-T line 92 for the compressor 32. To maintain the desired amount of air in the tire 14, the bias force is increased with temperature to increase the desired inflation pressure with temperature. The mounting of the bias magnet 60 may be configured to vary its position with temperature thereby changing the bias force with temperature to approximate the selected P-T line. The compressor 32 adds air to the tire 14 when the pressure-temperature (P-T point) of the air in the tire 14 is below the desired P-T line 92.

During installation of the device 12, the bias force of the compressor 32 may be selected or adjusted to follow a desired P-T line 92 ("compressor's PT line") that intersects the MRCP at an average ambient temperature for the area of use. The tire pressure normally stays on a P-T line determined by the amount of air in the tire. Of course, occasional additions by the compressor 32 to the amount of air in the tire 14 will be required due to leakage in the tire 14. In other words, the compressor 32 maintains the amount of air in the tire 14 constant, and the pressure in the tire 14 may fluctuate with temperature. This Constant Amount of Air approach may require adding less air to the tire and may keep the tire pressure closer to the desired pressure than the simpler Constant Pressure approach. Thus, in the fixed-amount-of-air alternative, only when air is added or released (or escapes) will the tire move to a higher (or lower) P-T line. If the tire's P-T point is below the compressor's desired P-T line 92, the compressor 32 pumps a small amount of air into the tire 14 each wheel 22 revolution. If the tire's P-T point is above the compressor's P-T line 92, no air is pumped into the tire 14 and normal leaks bring the tire's P-T point down to the compressor's P-T line 92. Using this fixed-amount-of-air paradigm, the compressor 32 replaces leakage air and maintains the amount of air in the tire 14 nearly constant, keeping it on the selected compressor P-T line 92 and minimizing the amount of air that must be added to the tire 14.

The bias magnets 60 may be mounted at one end of temperature sensitive positioning rods that establish the separation of the bias magnets 60 from the actuator 35 for three purposes: (1) to select the compressor's P-T line 92; (2) to vary the desired inflation pressure with temperature to match the selected P-T line 92; and (3) to offset the bias magnets' decreasing strength with increasing temperature. The positioning rod has a high thermal coefficient of expansion (TCE)

and is mounted to provide good thermal communication with the air in the tire. By configuring the TCE materials, their exposure to the air in the tire, and the separation of the bias magnets from the actuator, the desired inflation pressure provided by the bias force may be established.

FIG. 5 shows another embodiment of a flexible compressible chamber 33 having a bellows configuration. The bellows are in the open position similar to that shown in FIG. 4A in which the bias force is provided by a compression spring 62 attached to the actuator 35 and to the compressor body 44 such that it applies a continuous force to close the compression chamber. The transit of the magnetic field 36 of the magnetic element 30 applies an attractive magnetic force to the actuator 35 that overcomes the bias force of the compression spring 62 and causes the intake stroke, which expands the volume of the compression chamber 33. When the compressor moves out of the magnetic field 36, the bias force of the compression spring 62 pulls the actuator 35 back on the compression stroke, which reduces the volume of the flexible compression chamber 33. FIG. 5 further shows a different means of bonding an elastomeric bellows material to the actuator. As such, the device may further include a flapper valve as part of the bellows to avoid sealing problems. The compressor 32 further includes two bumpers 140, which protect the body of the compressor from the motion of the ferromagnetic actuator 35.

In the constant pressure approach, the bias force is selected or adjusted to the desired tire pressure, slightly above the MRCP, at the average ambient temperature. Thus, selecting or adjusting the bias force to the desired inflation pressure fixes the maximum pressure to be applied to the tire 14 and is used to establish the desired tire inflation pressure. The bias force on the actuator 35 and the area by which the actuator 35 applies force to the flexible compression chamber 33 determines the maximum pressure that the compressor 32 can produce. In this manner, the bias force is utilized to regulate pressure. For example, if the bias force on the actuator is 1.7 pounds and the actuator area is 0.05 square inches, the bias pressure is 34 psi, which is the maximum pressure produced. The bias force may be adjusted by adjusting the spacing of each bias magnet 60 in FIG. 4B in relation to the actuator 35 when the flexible compression chamber 33 is in an output position. Providing a calibrated adjustment to the bias force may permit manual change of the desired tire pressure to adapt to seasons, loads or other conditions. If a tire is inadvertently filled with too much air the normal tire leak rate will gradually correct this without compressor operation. The compressor 32 may be sized to overcome a nominal tire leakage rate with a vehicle travel rate, such as miles per month.

Figure 6A:
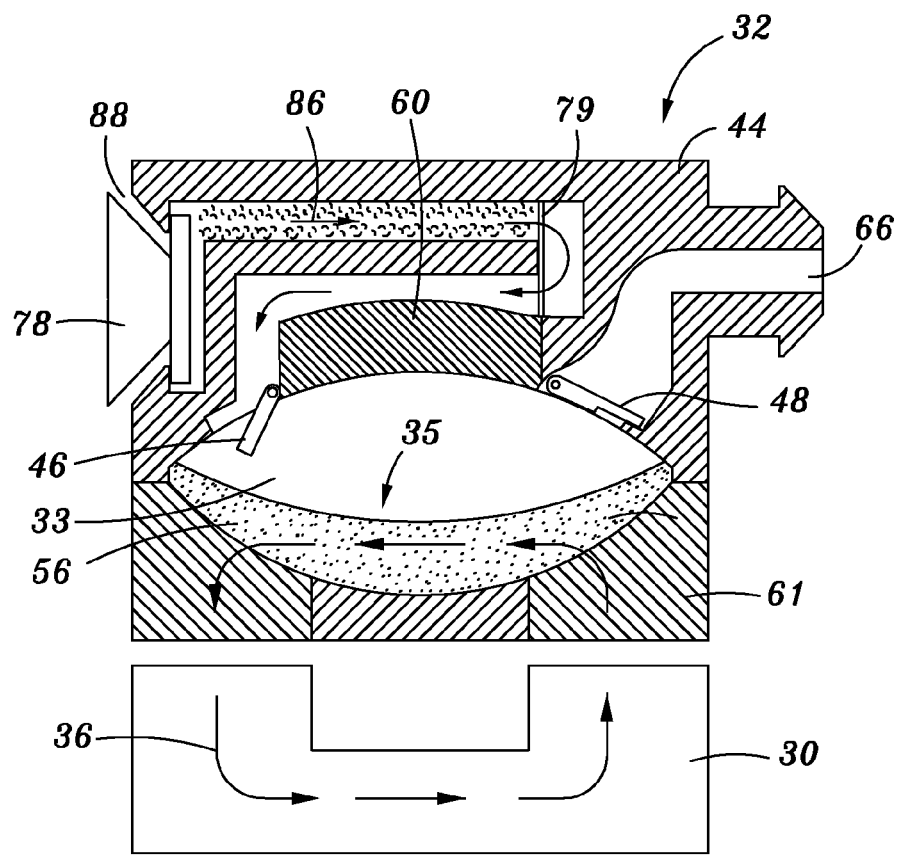
FIG. 6A is a cross-sectional view in which the compression chamber is bounded on one side by a flexible diaphragm with embedded ferromagnetic particles that also serves as the actuator, shown in the input position in the presence of a stationary permanent magnet.
Figure 6B:
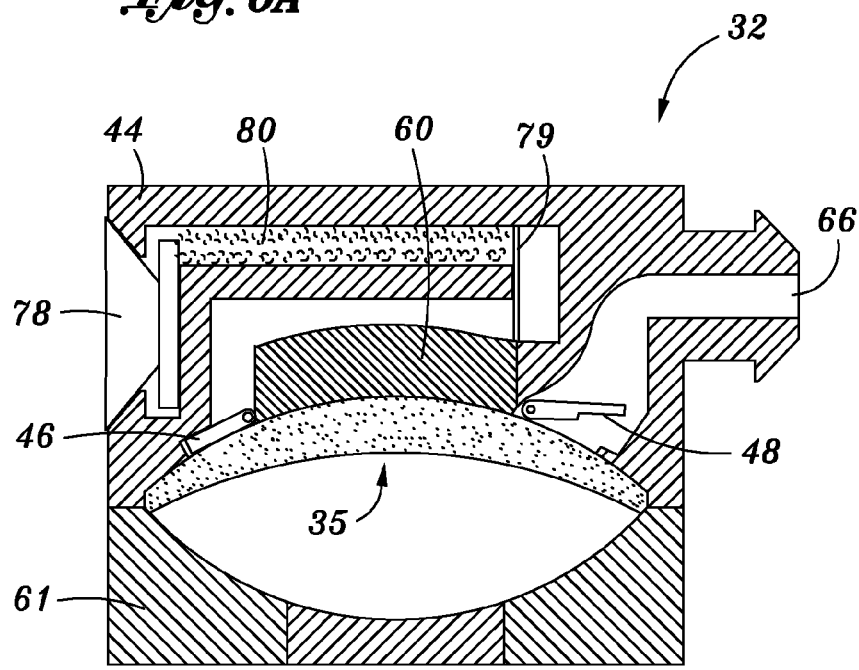
FIG. 6B is a cross-sectional view of an output position of the magnetic diaphragm compressor shown in FIG. 6A.

FIGS. 6A and 6B show a magnetically-driven diaphragm compressor 32 embodiment whose intake position is illustrated in FIG. 6A and output position is illustrated in FIG. 6B. The flexible compression chamber is bounded on one side by a flexible diaphragm 35 that is operative to: increase the volume of the chamber 33 and take in air through the intake valve 46 and decrease the volume of the chamber expelling air through the output valve 48. The magnetic element 30 is shown as a permanent magnet but could easily be an electromagnet. The flexible magnetic actuator 58 preferably has ferromagnetic particles embedded in a flexible diaphragm material. A short pneumatic tube 70 attached to the output port 66 conveys the output air to the tire valve stem 72, as shown in FIG. 7. FIG. 6A shows the compressor 32 adjacent the magnetic element 30 where the flexible magnetic actuator 58 is magnetically drawn to the intake position by the magnetic element 30, drawing air into the compression chamber 33 from the centrifugal intake valve 78, the intake plenum 86, the filter 80, the membrane 79, and the intake check valve 46. FIG. 6B shows the flexible magnetic actuator 58 held in the output position by the bias magnet 60 in the absence of the magnetic element 30, forcing the compressed output air out of the compression chamber 33 through the output check valve 48. The compressor body 44 is mostly non-magnetic, but includes two ferromagnetic pole extenders 61 that effectively shorten the air gap between the magnetic element 30 and the flexible magnetic actuator 58.

FIG. 7 shows an example mounting with an electromagnet 38 mounted on a drum brake backing plate 20 and the compressor 32 mounted on the wheel spoke 96 with a pneumatic tube 70 connecting the output port 66 of the compressor 32 to the valve stem 72. A central controller 100 directs current from the vehicle battery 40 to an electromagnet winding 116, as shown in FIG. 8, to produce the magnetic field 36 only while the compressor 32 transits the magnetic field 36. It may determine the location and speed of the compressor 32 on the wheel using a Hall Effect sensor to sense the passing of a small signal magnet mounted on the wheel at a known angle from the compressor 32. It then determines the speed and position of the compressor 32 and the time of its next transit.

The embodiments described above involve one compressor cycle of one intake stroke and one output stroke on each passage of the compressor 32 by the magnetic element 30. Such embodiments assume that one stroke, such as the intake stroke, occurs during the time period that the compressor is passing the magnetic element 30. The other stroke occurs during the balance of the wheel revolution. Other embodiments may reverse the input and output strokes. Further embodiments permit other numbers of compressor cycles per wheel revolution. For example, two stationary permanent magnets or electromagnets 30 may be positioned such that the compressor 32 passes both magnets during each wheel revolution, providing two compressor cycles per wheel revolution. Furthermore, a magnet 30 with two poles 87 that are adequately separated in the direction of relative compressor motion may effect two compressor cycles during one wheel revolution if transit of the fields concentrated about each pole causes the same one of the two opposing forces.

Whereas magnetic fields of opposite polarity have the same attracting force on a non-magnetized ferromagnetic actuator, magnetic fields of opposite polarity provide opposite attracting and repelling forces on a magnetized actuator. Thus, a magnetized actuator 35 may undergo alternating opposite forces upon passing two opposite magnetic poles 87 of a magnetic element 30, that are separated adequately in the direction of relative compressor motion as shown in FIG. 8. Thus a complete compressor cycle may occur without a bias force. Such alternating polarity fields can be provided by a permanent magnet or electromagnet with its poles far enough apart, or by two permanent magnets positioned with opposite poles facing the compressor as it passes. If the current in the winding 116 of an electromagnet 30 is reversed each wheel revolution the polarity of its magnetic field is alternated. A compressor with a magnetized actuator and no bias force will then experience alternating opposite forces on sequential wheel revolutions and complete one compressor cycle in two wheel revolutions. Embodiments without a bias force may use a pressure relief valve to establish and regulate the desired tire inflation pressure.

All of the embodiments described above use a magnetically-driven compressor. The following embodiments use an electric coil 104 to transit the magnetic field 36 of the magnetic element 30 and relay the induced electrical energy received by the coil 104 to an electrically-driven compressor 110. FIG. 9 illustrates an example arrangement showing a coil 104 connected by wire 98 to an electrically-driven compressor 110 mounted over a wheel hub 99 and sending the output air through a pneumatic tube 70 to the valve stem 72. As the electrical coil 104 transits a magnetic field 36, a pulse of one polarity is induced as the coil 104 enters the magnetic field 36 and a pulse of opposite polarity is induced as the coil 104 leaves the magnetic field 36, if the field 36 is wider than the coil 104. Further, it is also possible that if the poles are far enough apart, they may each drive an opposing force on a magnetized actuator and operate without a bias force. Such electrical pulses may directly drive an electrically-driven compressor 110. Almost any magnetically-driven compressor configuration may be converted to an electrically-driven compressor by attaching an electromagnet 38 that produces the type of magnetic field needed by the magnetically-driven compressor 32.

Figure 11:
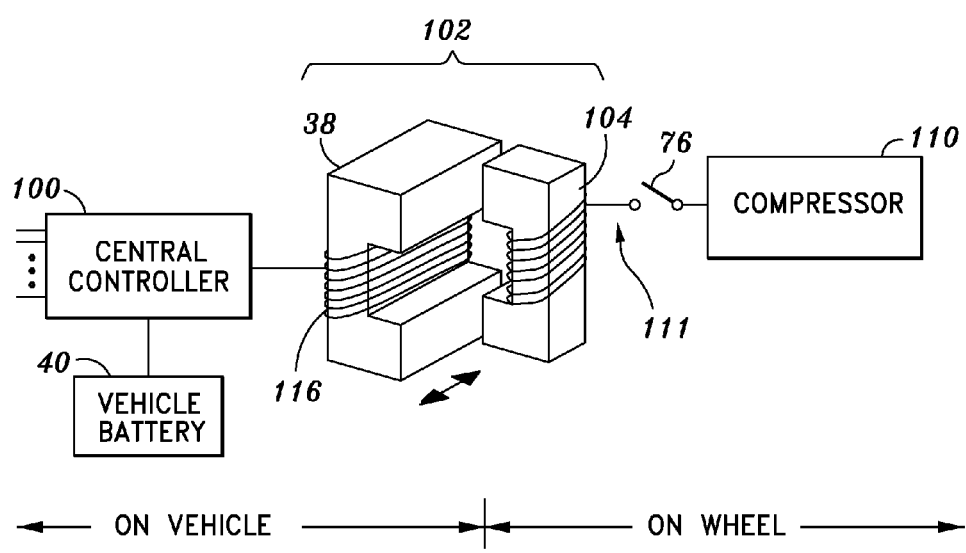
FIG. 11 is a schematic diagram of the electromagnet and electrical coil forming an intermittent split pulse transformer that provides induced electrical pulses directly to the electrically-driven compressor.

FIGS. 10 and 11 illustrate another embodiment using an electromagnet 38 for the magnetic element, and an electrical coil 104 that may transit the magnetic field. The combination of electromagnet 38 and electric coil 104 form an intermittent split pulse transformer 102 with a two-piece core. The transformer 102 may comprise two separate pieces, with the electromagnetic winding 116 on the electromagnet 38 serving as a primary winding on its portion of the transformer core, and the electrical coil 104 serving as a secondary winding and its portion of the core. The primary winding of the electromagnet 38 is mounted on a stationary element of a wheel assembly. The secondary winding of the electrical coil 104 is mounted on the wheel 22 where it passes near the primary winding once each wheel revolution. The split transformer 102 is operative during the period in which the two core portions are close enough to provide good magnetic communication. The central controller 100 may activate the primary winding only when there is satisfactory magnetic communication with the secondary winding. The switch 76 may be a pressure activated switch that limits the maximum pressure if a bias force is not used to regulate the pressure. The electrically-driven compressor 110 may be located anywhere on the wheel 22, preferably over the wheel hub 99. As discussed herein, the transformer 102 may be used in a variety of manners.

Figure 12:
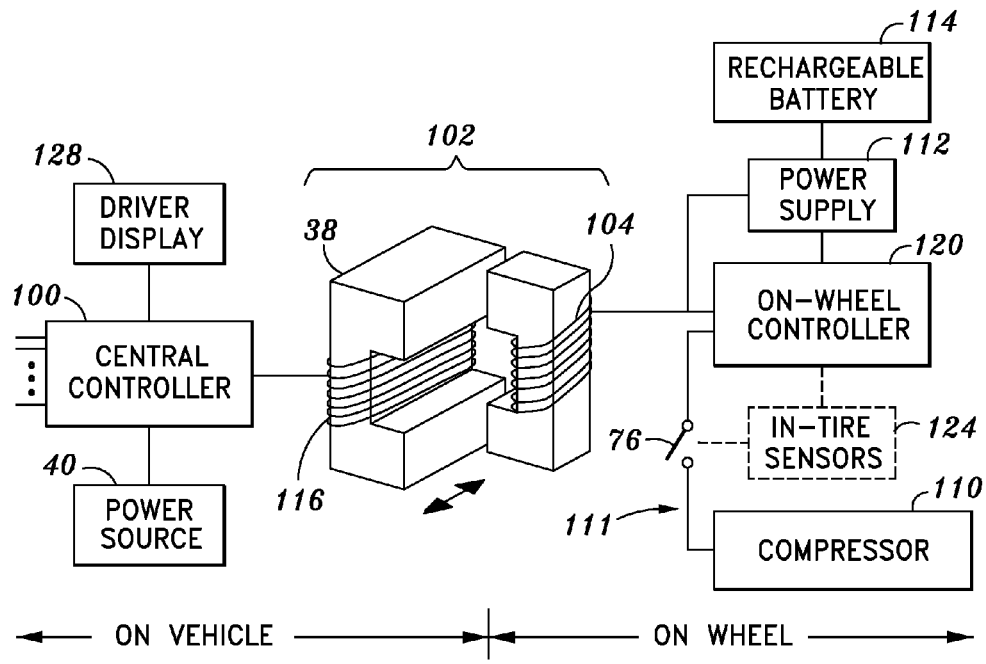
FIG. 12 is a schematic diagram of an embodiment using the intermittent split pulse transformer to transfer electrical power from the vehicle to operate the electrically-driven compressor and on-wheel electronics, and to transfer pulse coded data in both directions between the vehicle frame and the wheel to alert a driver to suspected leaks or failures.

For example, the transformer 102 may provide power to other on-wheel components for assisting in maintaining tire pressure, such as controllers, sensors, electrical energy storage devices, and/or compressors. As shown in FIG. 12, the output of the transformer 102 on the wheel may feed an on-wheel electronic power supply 112 that provides power in the form needed by on-wheel electronic elements and may also recharge a storage capacitor or a rechargeable battery 114 to store electrical energy for later use. Further, the transformer 102 may transfer pulse coded data in both directions between the controllers on the vehicle frame and on the wheel 22. Those familiar with the TPMS may recognize FIG. 12 as a combination of a TPMS and pressure maintenance device where the transformer 102 may serve the TPMS or compressor 110 or both. An on-wheel controller 120 may control the compressor 110 based on information from in-tire pressure and temperature sensors 124. A pressure activated switch 76, or pressure limit valve 74, or the bias force may limit the output pressure to the desired tire inflation pressure. The electrically-driven compressor 110 may be located anywhere on the wheel 22, preferably over the wheel hub 99.

FIG. 12 expands on the embodiment in FIG. 11 by adding an on-wheel controller 120, an on-wheel power supply 112, a simple driver display 128, and a small rechargeable battery 114. The power supply 112, as described above, permits use of any type of electrically-driven compressor and provides power for any on-wheel electronics. The on-wheel controller 120, preferably a microprocessor, may control compressor operation and the two-way data communication capability provided by the intermittent transformer 102. The on-wheel controller may receive control instructions from the central controller 100. It may send data regarding at least one of the compressor 110 utilization and output flow rate. The flow rate derived from a sensor in the output port 66 may be sent to the central controller 100. The central controller 100 sends an alert to the driver display 128 suggesting a possible leak when the utilization or flow rate of any wheel exceeds a predetermined threshold for a predetermined period. Similarly, it sends an alert to the driver display 128 when the utilization or flow rate has been zero for a predetermined period, suggesting possible failure of the device 12. The alerts indicate the wheel involved and nature of the alert. The small rechargeable battery 114, illustrated in FIGS. 11 and 12, is kept charged by a charging circuit in the power supply 112, and adds two valuable features. It provides power storage and smoothing for any on-wheel electronics and provides emergency power for brief periods of maximum speed compressor operation for a tire suspected of having a significant leak. In normal operation, the low duty cycle of power transfer through the intermittent transformer 102 limits compressor operation to that adequate for replacing normal leakage. In an emergency, such as when the driver is notified of a suspected leak, the compressor is operated at its highest speed on continuous power from the battery 114 until the battery 114 is completely discharged. This may allow a driver more time to find a safe stopping place before a leaking tire goes flat. A TPMS may benefit from the two-way communications between the wheel 22 and the vehicle and the rechargeable battery 114 to power the on-wheel electronics.

Addition of temperature and pressure sensors 124 to tires in the FIG. 12 embodiment allows adding the primary function of a TPMS, warning the driver when any tire 14 is significantly under-inflated. However, any value of such TPMS-like warnings is greatly reduced since significant under-inflation is unlikely to occur in this embodiment unless there is a significant leak in a tire or a device failure, which may be sensed and trigger alerts to the driver without in-tire sensors.

Figure 13:
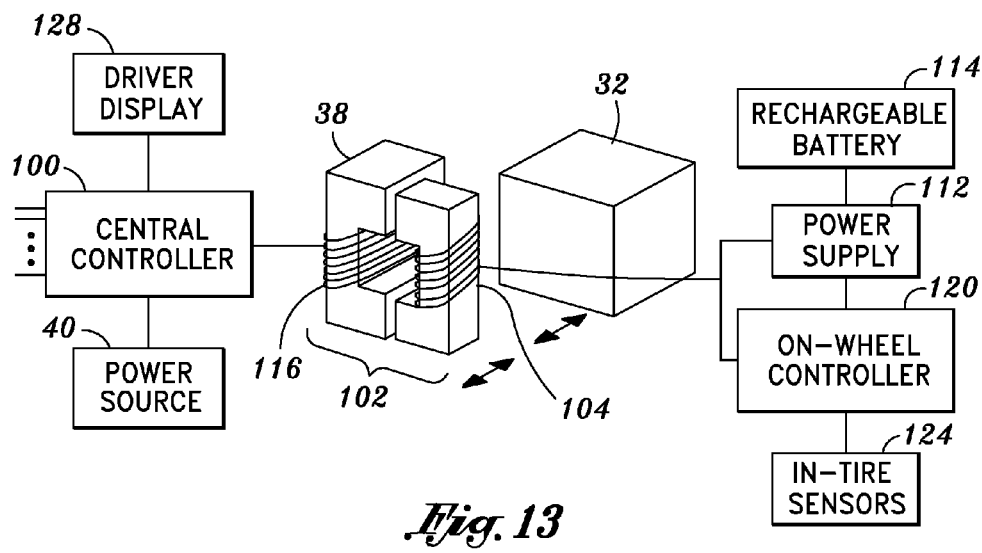
FIG. 13 is a schematic diagram of an embodiment as in FIG. 11 in which the magnetically-driven compressor and the electrical coil pass the electromagnet sequentially, the electrical coil supplying electrical power to only the on-wheel electronics and providing two-way pulse coded communication of alerts and control data between the vehicle and the wheel.

FIG. 13 illustrates an embodiment with the same features as in the embodiment in FIG. 12. However, the magnetically-driven compressor 32 and electrical coil 104 transit the magnetic field separately. Thus, a magnetically-driven compressor 32 is used instead of an electrically-driven compressor 110. The coil 104 and power supply 112 serves only the electronics and rechargeable battery 114 and not the magnetically-driven compressor 32.

As will be recognized by one of skill in the art, the aforementioned embodiments may be variously modified. For example, multiple pulses may be applied during one transit of a compressor or a coil past an electromagnetic; the magnetic element may be mounted on any stationary member (non-rotating part) of the wheel assembly from which it can be positioned close enough to the rotating compressor or coil; the compressor or electrical coil may be located anywhere that rotates with the wheel and passes near the magnetic element; any of the implementations described above can use multiple magnetic elements and/or multiple compressors or electrical coils on one wheel assembly; the devices may be used on wheels of any type of vehicle with inflatable tires; different types and configurations of magnets, compressors and electrical coils may be used; various combinations of magnets, compressors bias force means, pressure limit means, input and output means, check valves, element mounting means and configurations may be used.

Most of the above combinations of techniques are obviously still valid when some features are omitted. The means of driving a compressor is one of the important features of the present invention, not necessarily the nature of the compressor (therefore, piston-cylinder compressors, bellows compressors, diaphragm compressors, motor-driven compressors, solenoid compressors, and other types of compressors may also be substituted as viable compressors in embodiments of the present invention).

Referring back to FIGS. 4A and 4B, the reciprocating actuator 35 may be attached only to the flexible compression chamber. Because the centrifugal force is perpendicular to the axis of wheel rotation and the actuator strokes are parallel to the axis of wheel rotation. The flexibility of the compression chamber may allow the centrifugal force to displace the actuator slightly and push the side of the actuator against the wall of the compressor housing. As the actuator reciprocates, frictional forces between the actuator and the compressor wall may adversely affect the compressor's operation. For example, such an uncontrolled variable frictional force on the actuator may degrade the tire pressure limiting means that maintains a constant maximum output pressure. The embodiments shown in FIGS. 15-17 illustrate embodiments of the flexible compressible chamber 33 wherein the actuator's position and motion minimize the negative effect of centrifugal force of the wheel on the compressor's operation. As will be discussed herein, the actuator 35 is constrained from rubbing against the housing 142 which introduces unwanted frictional forces between the actuator and the compressor wall. The centrifugal force caused by the wheel's rotation does not significantly add to or subtract from the maximum output pressure of the compressor, as will be explained below.

Figure 14:
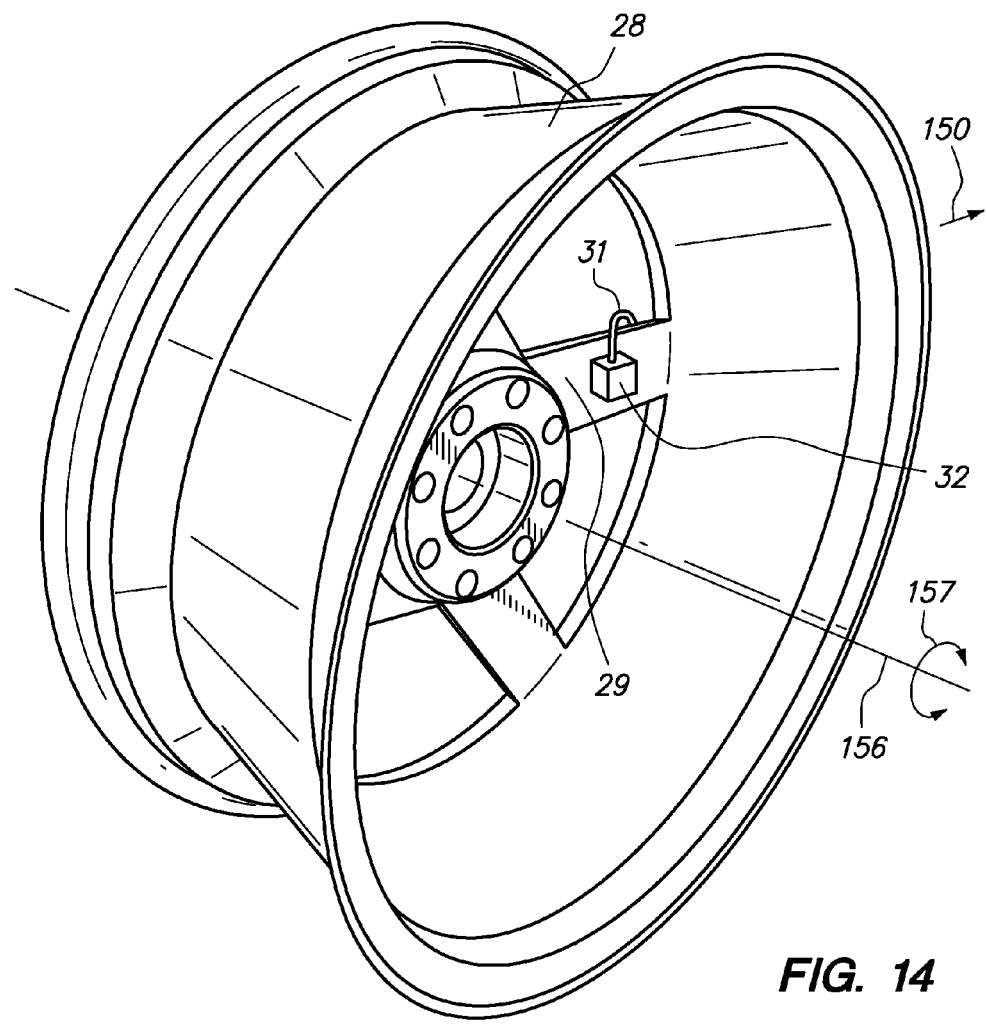
FIG. 14 is an oblique view showing where the compressor may be typically mounted on a wheel spoke.

FIG. 14 illustrates the compressor 32 to be discussed in relation to FIGS. 15A-17B mounted to a wheel spoke 29. The compressor 32 may be in air communication with the interior of the tire 14 with the pneumatic tube 31. The wheel rim 28 has a rotational axis 156. The wheel rim 28 rotates in either direction of arrow 157. The compressor 32 may be mounted to the wheel spoke or rim 28. Output of the compressor 32 may be in fluid communication with the interior of the tire to pump air into the tire. Rotation of the wheel about rotational axis 156 produces a centrifugal force 150 perpendicular to the rotational axis 156. It is this centrifugal force 150 that may push the actuator to rub against the side wall and adversely affect the functioning of the actuator shown in FIGS. 4A and 4B. The compressor 32 described in relation to FIGS. 15A-17B minimizes negative effects of centrifugal force 150 on the operation of the compressor 32.

Figure 15A:
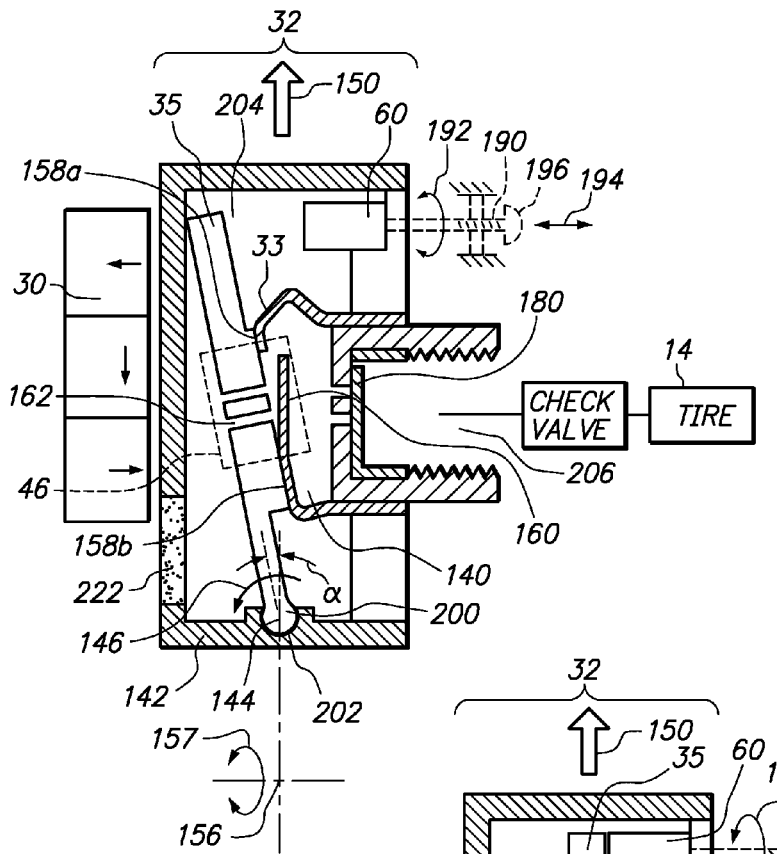
FIG. 15A is a cross sectional view of an alternate embodiment of a compressor that includes a flexible compressible chamber with the flexible compressible chamber shown in an intake position.
Figure 16:
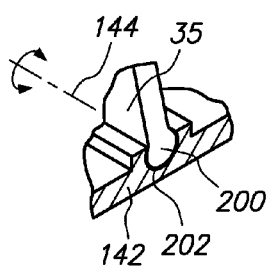
FIG. 16 is a perspective cross sectional view of a hinge for rotating an actuator of the compressor shown in FIGS. 15A and 15B.
Figure 15B:
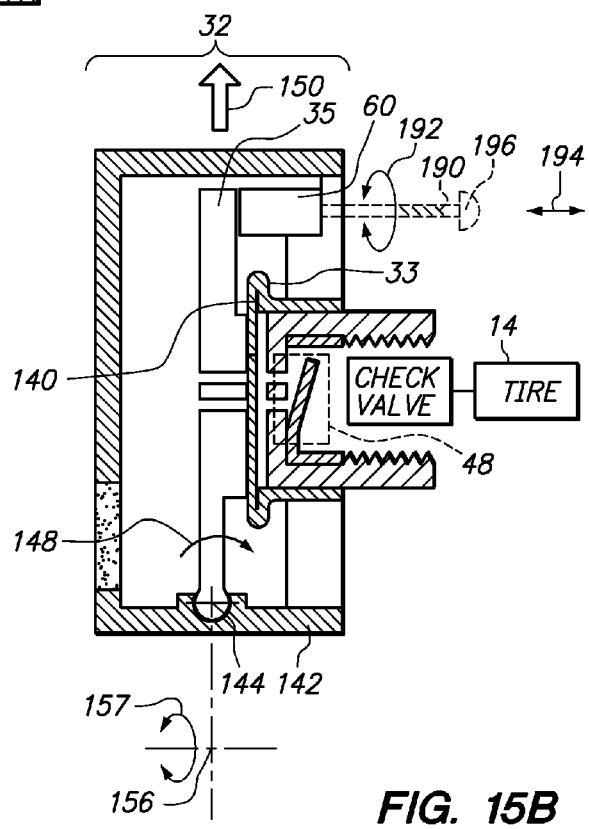
FIG. 15B is a cross sectional view of the alternate embodiment of the compressor shown in FIG. 14A with the flexible compressible chamber shown in an output position.

Referring now to FIGS. 15A and 15B, a hinged actuator 35 is shown. The hinged connection between the actuator 35 and the compressor wall 142 restrains the actuator 35 from rubbing against the housing wall 142, as in FIG. 4, thereby avoiding variable frictional forces caused when the actuator 35 rubs against the compressor wall 142. The embodiment of the flexible compressible chamber 33 shown in FIGS. 15A and 15B may have an asymmetric bellows configuration. The flexible compression chamber 33 has an intake position shown in FIG. 15A and an output position shown in FIG. 15B. As the actuator 35 moves toward the end of the intake position, the compression chamber 33 is pulled open since one side of the compression chamber 33 is attached to the actuator 35. As the chamber volume increases, air is drawn into the flexible compressible chamber 33 to replace any air forced out of the chamber on the previous output stroke. Air is drawn into the flexible compressible chamber 33 through the intake valve 46 from the intake plenum 204. Air is drawn into the intake plenum 204 through a porous portion (or air filter) 222 of the housing 142 or a centrifugal intake valve (described earlier). To complete the cycle, the actuator moves toward the end of the output position. The flexible compressible chamber 33 is compressed by the bias magnet to reduce the volume of the chamber volume 140. When the flexible compressible chamber 33 approaches the position shown in FIG. 15B, some of the compressed air within the chamber volume 140 may be forced into the tire 14 through output valve 48. To move the flexible compressible chamber 33 between the intake position and the output position, the flexible compressible chamber 33 is attached to the actuator 35. The actuator 35 is rotatably hinged to the housing 142 of the compressor 32 by way of a bead 200 and groove 202 connection as shown in FIGS. 15A-16. The actuator 35 may rotate about hinge axis 144 in the direction of arrows 146, 148 (see FIGS. 15A and 15B). The hinge axis 144 of the actuator 35 may be generally parallel to the wheel's rotation axis 156. The actuator 35 does not rub against the housing 142 to create variable friction forces. To rotate the actuator 35 in the direction of arrow 146 (see FIG. 15A), the compressor 32 may be mounted to a rotating member (e.g., wheel spoke) of the wheel assembly 10 (see FIG. 14), whereas a magnetic element 30 may be fixed to a stationary portion of the wheel assembly. When the compressor 32 moves within the magnetic field of the magnetic element 30, the magnetic element 30 creates a counterclockwise moment in the actuator 35 causing the actuator 35 to be drawn toward the magnetic element 30, as shown in FIG. 15A.

To rotate the actuator 35 in direction of arrow 148 (see FIG. 15B), the centrifugal force 150 on the actuator 35 due to wheel rotation creates a clockwise moment in the actuator 35 and urges the actuator 35 in the direction of the arrow 150 representing the centrifugal force shown in FIG. 15B. The hinge axis 144 of the compressor 32 may be positioned perpendicular to the wheel rotation axis 156. When the actuator 35 is at the end of the output position, the centrifugal force 150 provides no significant closing force to the flexible compressible chamber 33. The bias magnet 60 does almost all, if not 100%, of the force to move the actuator 35 the last degree or so to the closed position. When the actuator 35 is not aligned with the centrifugal force 150 as shown in FIG. 15A, the centrifugal force 150 may impose a transverse component to the actuator 35 that urges the actuator 35 toward (or away from) the closed position (see FIG. 15B). The transverse component of the centrifugal force 150 acting on the actuator 35 and the bias magnet 60 both aid in moving the actuator 35 toward the end of the output position. However, as the actuator 35 approaches the closed position shown in FIG. 15B, the transverse component of the centrifugal force 150 acting on the actuator 35 approaches zero (0) thereby the bias magnet 60 provides the predominant closing force if not the entire closing force to the actuator 35 and the flexible compressible chamber 33. The bias magnet 60 provides the final closing force thereby allowing the constant magnitude of the bias force of the bias magnet 60 to limit the maximum pressure applied to the tire to the desired tire pressure.

During operation of the compressor 32, the compressor 32 transits the field of the magnetic element 30 once per each revolution of the wheel. It is also contemplated that multiple magnetic elements 30 may be attached to stationary components of the wheel assembly 10 so that the compressor 32 can cycle more than once per each revolution of the wheel. However, for the sake of clarity, the single magnetic element 30 embodiment is discussed, although multiple magnetic elements 30 may be employed. When the compressor 32, and more particularly, the actuator 35 is within the magnetic field of the magnetic element 30, the force of the magnetic element 30 overcomes the bias force of the bias magnet 60 and the transverse component of the centrifugal force to induce a counterclockwise moment so that the actuator 35 is rotated in direction of arrow 146. The actuator 35 may contact the housing 142 to stop motion of the actuator 35 but does not rub against the housing. The flexible compressible chamber 33 may be secured to the actuator 35 at an area that includes points 158*a, b*. A flap 160 may be moved away from an aperture 162 (see FIG. 15A) or mate with the actuator 35 (see FIG. 15B) to close the aperture 162. When the actuator 35 moves in the direction of arrow 146, the chamber volume 140 is increased and creates a partial vacuum within the chamber volume 140. Since the pressure within the chamber volume 140 is less than the pressure within the intake plenum 204, the flap 160 is moved away from the actuator 35 as shown in FIG. 15A causing air to flow into the chamber volume 140, replacing the air previously forced into the tire. Many other types of one-way check valves may be used in place of the input valve 160 and output valve 48.

Once the compressor 32 is out of the magnetic field of the magnetic element 30 (see FIG. 15B), the centrifugal force 150 and the bias force of the bias magnet 60 moves the actuator 35 in the direction of arrow 148 shown in FIG. 15B. If the tire pressure is below the desired tire pressure, the output valve opens and air flows to the output port. The bias magnet 60 provides the final closing force of the actuator 35 thereby only allowing a limited air pressure into the tire 14. A stop plate may limit how close the actuator 35 may come to the bias magnet thereby limiting the closing force and resulting pressure. The transverse component of the centrifugal force 150 may provide a negligible amount of closing force to the actuator 35. The bias magnet 60 provides the majority, if not all of the closing force to the actuator 35. However, if the tire pressure is above the desired tire pressure, the cumulative effect of the transverse component of the centrifugal force 150 acting on the actuator 35 and the bias force of the bias magnet 60 is not able to create pressure within the chamber volume 140 above the desired tire pressure, thereby assuring that air is never forced into the tire when the tire pressure exceeds the desired tire pressure.

As the wheel continues to rotate about rotation axis 156, the compressor 32 enters the magnetic field of the magnetic element 30. At this time, the magnetic force of the magnetic element 30 initiates the intake stroke by overcoming the magnetic force 178 of the bias magnet 60 and the transverse component of the centrifugal force 150 so that the actuator 35 is moved toward the magnetic element 30 in the direction of arrow 146. The wheel continues to rotate increasing the volume of the compression chamber and opening the input valve and drawing air into the tire 14.

As the wheel continues to rotate and the compressor 32 continues to pump air into the tire 14 during each wheel revolution the tire pressure will reach the desired tire inflation pressure. The pressure within the tire 14 may reach the desired tire pressure for other reasons such as a change in elevation or temperature. Nonetheless, when the pressure within the tire 14 is at or above the desired tire pressure, the compressor 32 ceases to pump air into the tire 14. The reason is that the force of the tire pressure keeps the output valve 48 closed. More particularly, when the pressure of the tire 14 is at or above the maximum compressor pressure which equals the desired tire pressure, the tire pressure force applies a net closing force to the flap 180 of the output valve 48 shown in FIG. 15B. When the compressor 32 leaves the magnetic field of the magnetic element 30, the transverse component of the centrifugal force 150 and the bias force of the bias magnet 60 on the actuator attempts to compress the flexible compressible chamber 33 and compression of air in the chamber volume 140. However, the flap 180 of the output valve 48 remains in the closed position. The maximum force created by the transverse component of the centrifugal force 150 and the bias force of the bias magnet 60 is not sufficient to open the output valve 48 which is being held closed by the tire pressure force. The actuator 35 may rotate slightly due to the hinge and the flexible nature of the flexible compressible chamber 33. However, air is not introduced into the tire 14 by way of the output valve 48 when the tire pressure is greater than the maximum compressor output pressure which equals the desired tire pressure.

Figure 17A:
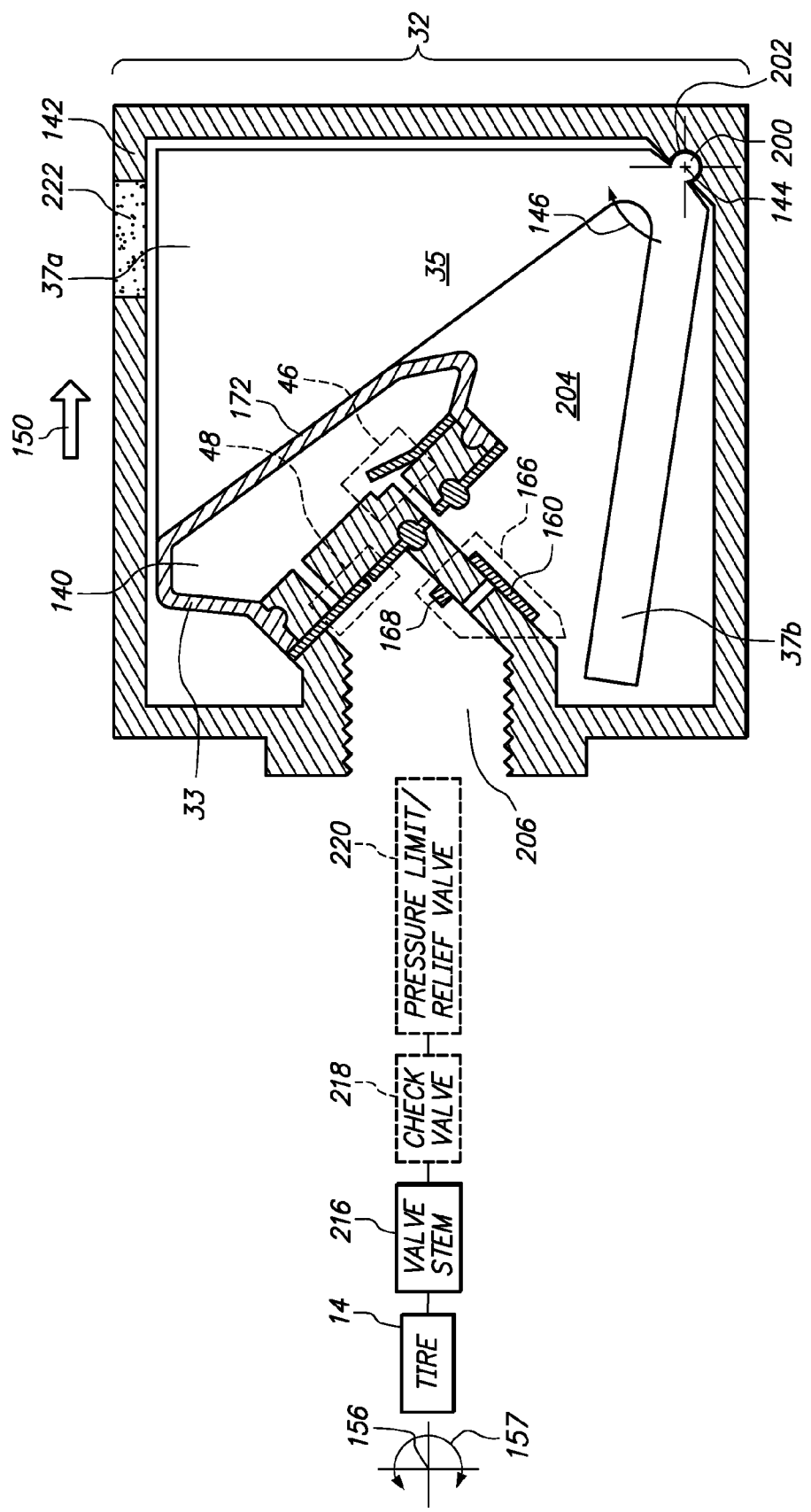
FIG. 17A is another embodiment of a flexible compressible chamber compressor with a pressure limit valve wherein the flexible compression chamber is in an intake position and a centrifugal force drives an intake stroke.
Figure 17B:
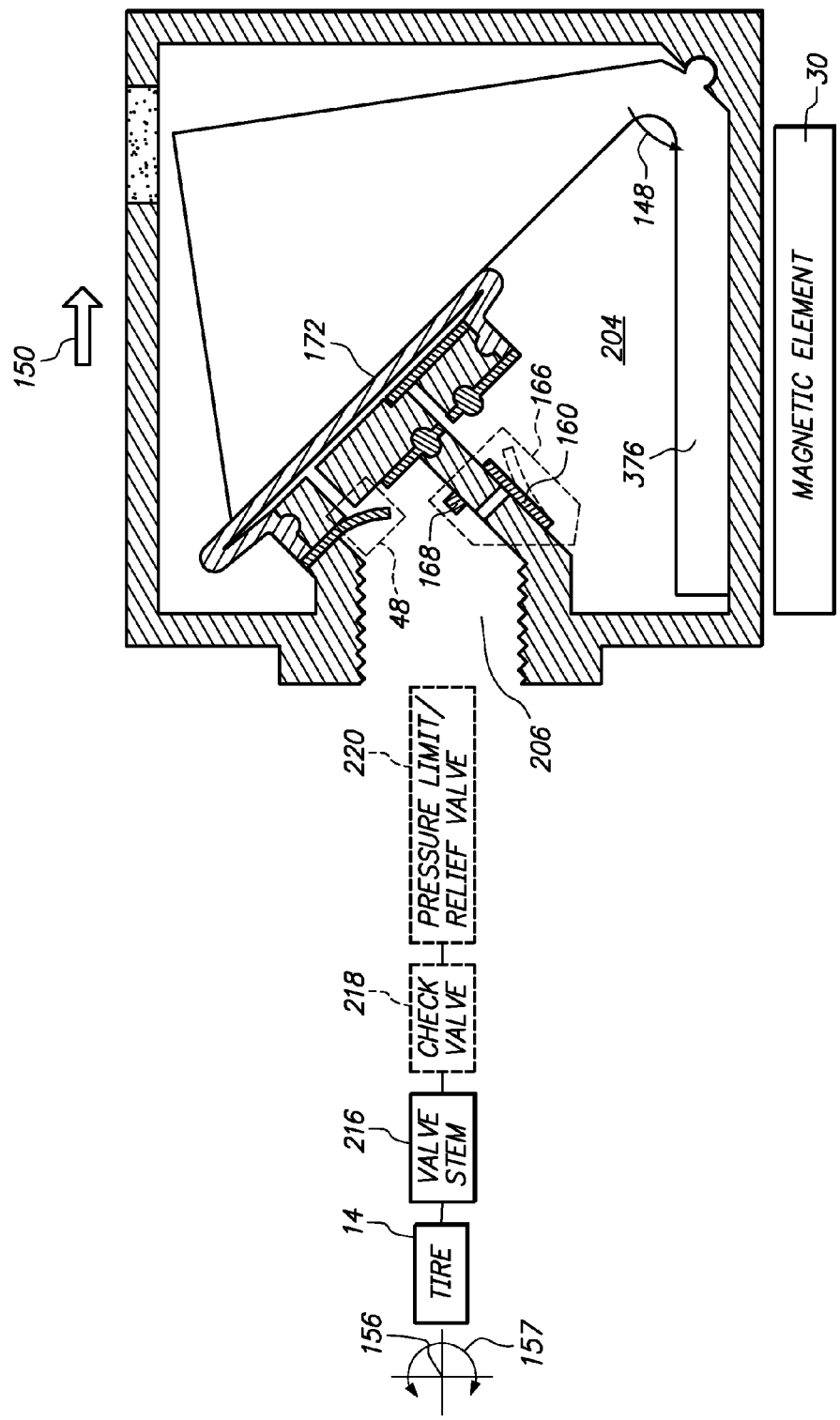
FIG. 17B illustrates the flexible compressible chamber compressor shown in FIG. 17A wherein the flexible compressor chamber is in an output position and a stationary magnetic element drives an output stroke.

Referring now to FIG. 17A and 17B, another embodiment of the compressor 32 is shown. The compressor 32 may be mounted to a wheel so that a centrifugal force 150 may drive an intake stroke of the compressor 32. The compressor 32 may be mounted to the wheel rim 28 so that rotational axis 144 of the actuator 35 is generally perpendicular to the wheel rotational axis 156 of the wheel. The actuator 35 of the compressor may be rotatable about rotational axis 144 in the direction of arrows 146, 148 by way of a hinge illustrated as a bead 200 and groove 202 connection. The centrifugal force 150 creates a clockwise moment on the actuator 35 and rotates the actuator portion 37*a* in the direction of arrow 146 or intake stroke, as shown in FIG. 17A. One or more times during rotation of the wheel, the actuator of the compressor 32 may enter a magnetic field of the magnetic element 30 which may be mounted to a stationary member of the wheel assembly. The magnetic field of the magnetic element 30 may be large enough to encompass at least a portion of the actuator portion 37*b*. The magnetic field creates a counterclockwise moment on the actuator 35 and overcomes the centrifugal force 150 so that the actuator 35 is rotated in the direction of arrow 148, as shown in FIG. 17B. When the actuator 35 moves out of the magnetic field of the magnetic element 30, the actuator 35 is rotated in the direction of arrow 146 under the force of the centrifugal force, as shown in FIG. 17A. The flexible compressible chamber 33 is expanded so as to draw air into the chamber volume 140 by way of input valve 46. An input filter 222 in the housing 142 introduces clean, dry air into the plenum 204. The output valve 48 closes when the actuator 35 is rotated in direction of arrow 146. When the actuator 35 transits the magnetic field of the magnetic element 30, the actuator 35 moves toward the output position in direction of arrow 148. The actuator 35 compresses the flexible compressible chamber 33 and reduces the volume within the chamber 140 thereby increasing the pressure in the chamber. The output valve 48 opens and outputs air each time the actuator 35 cycles, as shown in FIG. 17B. During each revolution of the tire, the compressor 32 may cycle one or more times depending upon the number of magnetic elements 30 being used. As the compressor 32 pumps air into the tire 14, the pressure within the tire 14 increases until the pressure within the tire 14 is at or above the desired tire inflation pressure set by a pressure limit valve 166. When the pressure within the tire is at or above the desired tire inflation pressure, the pressure limit valve 166 may open so that additional air is not introduced into the tire 14. The pressure limit valve 166 may comprise a bias magnet 168 that holds a flap 160 closed when the pressure within the tire 14 that appears in the output port 206 is below the desired tire inflation pressure. The effect of the bias force of the bias magnet 168 on the valve flap 180 is sufficient to hold the flap 160 closed when the pressure within the output port 206 is below the desired tire inflation pressure but not when the pressure within the output port 206 is above the desired tire inflation pressure.

During operation, the wheel rotates so as to create a centrifugal force 150 acting upon the actuator 35. Also during operation, the actuator 35 intermittently moves within the magnetic fields of one or more magnetic elements 30. As the wheel rotates, the compressor 32 experiences centrifugal force 150 which moves the actuator 35 in the direction of arrow 146 (see FIG. 17A). The actuator 35 may be attached to the flexible compressible chamber 33 at point 172 thereby opening or increasing the volume of the chamber volume 140 as the actuator 35 moves in direction of arrow 146. Air is introduced into the chamber volume 140 from the plenum 204 by way of the input valve 46.

As the wheel is rotated so that the compressor 32 transits the magnetic field of the magnetic element 30, the magnetic field of the magnetic element 30 acts upon the actuator 35 so as to rotate the actuator 35 in the direction of arrow 148. At this time, the input valve 46 closes. The actuator 35 motion causes the flexible compressible chamber 33 to collapse. As the actuator 35 continues to close the flexible compressible chamber 33, the pressure within the flexible compressible chamber 33 will exceed the desired tire inflation pressure. The actuator 35 reciprocally rotates through a small arc about the rotational axis 144 in the direction of arrows 146 and 148 to force spurts of air out of the output valve 48. When the pressure within the output port 206 which is the same as in the tire 14 is above the desired tire inflation pressure, the pressure limit valve 166 is opened. The bias magnet 168 can no longer hold the flap 160 of the pressure limit valve 166 closed. Air escapes from the output port 206 back to the intake plenum 204. When the pressure in the tire 14 is below the desired tire pressure, the pressure limit valve 166 remains closed and the air forced out of the output valve 48 proceeds through the output port 206 into the tire 14. When the pressure in the tire exceeds the desired tire pressure, the air forced out of the output valve 48 opens the limit valve 166 or 220 and releases air from the output port 206 to the intake plenum 204 or if relief valve 220 is used the atmosphere. Up until the tire pressure reaches the desired tire pressure, the pressure limit valve 166 or 220 remains closed. The flexible compressible chamber 33 continues to pump air into the output port 206. Each time the pressure within the output port 206 exceeds the desired tire inflation pressure, the pressure limit valve 166 opens.

The bias force of the bias magnet 60 (see FIGS. 15A and 15B) may be adjusted manually. For manual adjustment, the bias magnet 60 may be attached to a threaded rod 190 (see FIG. 15A) that can be rotated as indicated by arrow 192 to bring the bias magnet 60 closer to or further away from the closed actuator 35 position as shown by arrow 194 in FIG. 15B. The threaded rod 90 may be rotated with application of a screw driver to a head 196. The threaded rod 190 or threaded head 196 may be calibrated and marked so that at a certain position of the rod 190 or head 196, the bias magnet 60 position may change the desired tire pressure within the tire 14 to a particular pressure such as 30, 31, 32, 34, 35 psi, etc.

It is also contemplated that the actuator 35 shown in FIGS. 17A and 17B may move in reverse direction. The stationary magnet 30 may drive the intake stroke. The centrifugal force 160 may drive the output stroke.

Referring back to FIGS. 17A and 17B, the tire 14 may have a valve stem 216. The valve stem 216 is a one-way valve which allows air to be introduced into the tire 14 based on differences in a pressure downstream and upstream of the valve stem 216. Air from the tire 14 may be manually released through the valve 216 by depressing a needle of the valve stem 216. However, during normal operation, the valve stem 216 allows air to enter into the tire 14 but not escape therefrom. It is contemplated that the compressor 32 may have a check valve 218 for safety, to avoid air escaping from the tire 14 and through the pressure limit valve 220. It is also contemplated that the pressure limit valve 166 may be replaced with a pressure limit valve 220.

In the embodiments shown and described in relation to FIGS. 15-17, the magnetic element drives one of the input stroke and output stroke, and the bias magnet drives the other of the input stroke and the output stroke. The reverse is also contemplated. The magnetic element discussed in relation to the embodiments shown in FIGS. 14-17 may be a permanent magnet, an electromagnet or a combination thereof.

Referring now to the flexible compressible chamber 33 shown in FIGS. 15A, 15B, 17A and 17B, the flexible compressible chamber 33 may be fabricated from an elastomeric material as well as a metallic material. Accordingly, the term flexible compressible chamber should be interpreted so as to include a class of devices called metal bellows. These metal bellows have advantages in areas of life, environment and permitting higher pressures than molded elastomers. The metal bellows may provide longer life and protect against environmental degradation, higher pressure as compared to molded elastomer bellows, strength and sealing to the housing. It is also contemplated that the other flexible compressible chamber discussed in the application such as those shown in FIGS. 4A, 4B, 5, 6A and 6B may also be fabricated from a metallic material or elastomeric material.

Referring now to the stationary magnet 30 shown in FIG. 15A, the stationary magnet may comprise three different magnets with their magnetic field polarity directed in three different directions which is shown in FIG. 15A. The three magnets may be assembled side by side with the magnetic fields in the direction as indicated in FIG. 15A. This maximizes the magnetic field strength in the direction of the actuator 35 as the compressor transits the magnetic field.

A variety of means may be used with any of the embodiments described herein to communicate the compressed output air from the compressor's output port to the tire interior. By way of example and not limitation, a pneumatic tube may provide communication from the compressor output port to the standard tire valve stem, a pneumatic tube may provide communication to a custom valve stem, a pneumatic tube may provide communication into the tire interior through a separate hole in the wheel rim, and/or the housing of the compressor may be embedded in a wheel spoke, with an air duct within the spoke leading to the tire interior.

The above description is given by way of example, and not limitation. Given the above disclosure, one skilled in the art could devise variations that are within the scope and spirit of the invention disclosed herein, including various ways of utilizing or modifying embodiments of the present invention. Further, the various features of the embodiments disclosed herein can be used alone, or in varying combinations with each other and are not intended to be limited to the specific combination described herein. Thus, the scope of the claims is not to be limited by the illustrated embodiments. Other modifications may be variously implemented utilizing the teachings found herein.

What is claimed is:

1. A device for maintaining a desired inflation pressure of an interior of a tire mounted on a wheel of a vehicle, the wheel being rotatably connected to a stationary member of a vehicle wheel assembly and defining an axis of rotation, the device comprising:

a housing;

at least one magnetic element being mounted on a stationary member at a radial distance from the axis of rotation, the magnetic element producing a magnetic field wherein the magnetic field produces at least one of two opposing forces;

a magnetically driven air compressor being mounted on the wheel and being radially disposed from the axis of rotation relative to the magnetic element to transit the magnetic field during each revolution of the wheel, the compressor being in fluid communication with the atmosphere and the interior of the tire, the compressor being operative to intake air from the atmosphere or to output compressed air to the interior of the tire in response to transiting the magnetic field wherein the compressor includes a flexible compression chamber defining a variable chamber volume; and means for limiting output pressure of the compressor to the desired inflation pressure;

an actuator rotatable with respect to the housing, the actuator being operative to increase and decrease the chamber volume, the actuator being operative to effect an intake stroke to increase chamber volume and thereby intake air from the environment through an intake filter, the actuator further being operative to effect an output stroke to decrease chamber volume and thereby expel air through an output port; and means for applying first and second opposing forces alternately to the actuator, one of the first and second opposing forces increasing the volume of the flexible chamber and the other of the first and second opposing forces decreasing the volume of the flexible chamber, at least one of the first and second opposing forces being produced upon transit of the actuator through the magnetic field.

2. The device of claim 1 wherein the actuator is aligned with the centrifugal force at an end of the output stroke so that the centrifugal force applies no significant force in the actuator's path of rotation.

3. The device of claim 1 wherein the flexible compression chamber is a bellows configuration having two opposing sides and flexible side walls, the actuator being operative to increase the chamber volume to intake air into the compression chamber through the intake filter upon the actuator moving toward an intake position during the intake stroke, the actuator being further operative to decrease the chamber volume and expel compressed air from the compression chamber through the output port upon moving to an output position during the output stroke, one of the input stroke and output stroke being performed in response to the compressor transiting the magnetic field.

4. The device of claim 1 including two or more stationary magnetic elements and wherein the compressor transits through two or more separate magnetic fields produced by the magnetic elements during one revolution of the wheel, the magnetic fields exerting the first opposing force upon the actuator to perform one of the input and output strokes, the second opposing force being exerted upon the actuator to perform the other of the input and output strokes as the compressor moves intermediate the magnetic fields, the alternate exertion of the first and second opposing forces causing the chamber volume to increase and decrease at least twice during one wheel revolution.

5. The device of claim 1, wherein the two or more magnetic elements produce two or more instances of the opposing forces.

6. The device of claim 1 wherein the second opposing force is a continuous bias force being produced by one or more permanent magnets, the second opposing force being configured to be overcome by the first opposing force produced when the compressor transits the magnetic field of the stationary magnetic element, the second opposing force causing the actuator to effect one of the input and output strokes after transiting the magnetic field.

7. The device of claim 1 wherein one of the opposing forces is configured to establish and limit the output to the desired inflation pressure of the tire.

8. The device of claim 1 wherein the means for limiting the output pressure of the compressor permits manual adjustment of the desired tire inflation pressure.

9. The device of claim 1 wherein the second opposing force on the actuator is a continuous bias force being produced by one or more permanent magnets, the second opposing force being configured to be overcome by the first opposing force produced when the actuator transits the magnetic field of the stationary magnetic element, the second opposing force causing the actuator to effect one of the input and output strokes after transiting the magnetic field.

10. The device of claim 1, wherein the first opposing force causes the actuator to rotate in a first angular direction to cause the output stroke and the second opposing force causes the actuator to rotate in a second angular direction to cause the input stroke, the second direction being opposite the first direction.

11. The device of claim 10, wherein the second opposing force is a centrifugal bias force.

12. A device for maintaining a desired inflation pressure of an interior of a tire mounted on a wheel of a vehicle, the wheel being rotatably connected to a stationary member of a vehicle wheel assembly and defining an axis of rotation and producing a centrifugal force, the device comprising:

at least one magnetic element being mounted on the stationary member at a radial distance from the axis of rotation, the magnetic element producing a magnetic field;

an air compressor being mounted on the wheel and being radially disposed from the axis of rotation relative to the magnetic element to transit the magnetic field during each revolution of the wheel, the compressor being in fluid communication with the atmosphere and the interior of the tire, the compressor being operative to intake air from the atmosphere and to output compressed air to the interior of the tire in response to transiting the magnetic field, the compressor comprising:

a housing;

a compression chamber defining a variable chamber volume;

an actuator rotatable with respect to the housing, the actuator being operative to cause an increase and decrease in the chamber volume, the actuator effecting an intake stroke to increase chamber volume and thereby intake air from the environment through an intake filter, the actuator effecting an output stroke to decrease chamber volume and thereby expel air through an output port; and means for applying first and second opposing forces to the actuator, one of the first and second opposing forces increasing the chamber volume and the other of the first and second opposing forces decreasing the chamber volume, at least one of the first and second opposing forces being cyclically produced upon cyclical transit of the actuator through the magnetic field; and a pressure limit valve which is opened to release air out of the output port when the pressure in the output port is above the desired tire pressure.

13. The device of claim 12 wherein the maximum pressure output is the desired inflation pressure of the interior of the tire and is set to limit the compressor output pressure at the desired inflation pressure.

14. A device for maintaining a desired inflation pressure of an interior of a tire mounted on a wheel of a vehicle, the wheel being rotatably connected to a stationary member of a vehicle wheel assembly and defining an axis of rotation and producing a centrifugal force, the device comprising:
at least one magnetic element being mounted on the stationary member at a radial distance from the axis of rotation, the magnetic element producing a magnetic field;
an air compressor being mounted on the wheel and being radially disposed from the axis of rotation relative to the magnetic element to transit the magnetic field during each revolution of the wheel, the compressor being in fluid communication with the atmosphere and the interior of the tire, the compressor being operative to intake air from the atmosphere and to output compressed air to the interior of the tire in response to transiting the magnetic field; and
means for limiting output pressure of the compressor to the desired tire inflation pressure.

15. A device to maintain a desired air pressure within a tire mounted on a wheel of a vehicle, the wheel being rotatably connected to a stationary member of a vehicle wheel assembly, the device comprising:
at least one magnetic element mounted on a stationary member of the vehicle wheel assembly at a radial distance from the axis of wheel rotation, the magnetic element producing a magnetic field;
at least one magnetically driven air compressor mounted on the wheel at a radial distance from the axis of wheel rotation where the compressor transits the magnetic field during each wheel revolution, the compressor having a compression chamber of variable volume connected to an actuator on which the magnetic field exerts a force as the actuator transits the magnetic field that drives at least a first one of two opposing forces that cause alternating increases and decreases in compression chamber volume, the compressor being in fluid communication with the atmosphere and the tire interior, air being drawn into the chamber from the atmosphere through an intake valve and air being expelled from the chamber through an output valve into the tire when pressure in the compression chamber exceeds the pressure in the tire;
wherein the device produces an output pressure that does not exceed a desired tire pressure.

16. The device of claim 15 wherein the compression chamber is a bellows.

17. The device of claim 15 wherein the compression chamber comprises a cylinder and piston that is slidably movable within the cylinder.

18. The device of claim 15 wherein the compression chamber is bounded on at least one side by a flexible diaphragm.

19. The device of claim 15 wherein an input filter disposed adjacent to the intake valve prevents particulate or liquid contaminants from entering the compression chamber.

20. The device of claim 15 wherein a second of the two opposing forces on the actuator is a continuous bias force being configured to be overcome by the first opposing force produced on the actuator.

21. The device of claim 20 wherein the second opposing bias force on the actuator is produced by at least one spring.

22. The device of claim 20 wherein the second opposing bias force on the actuator is a produced by at least one permanent magnet.

23. The device of claim 20 wherein the second opposing force on the actuator is a centrifugal bias force produced by wheel rotation.

24. The device of claim 18 wherein the flexible diaphragm contains ferrous particles so that the flexible diaphragm serves as the actuator.

25. The device of claim 15 wherein the two opposing alternating forces on the actuator are not co-linear, wherein the actuator is attached to the compressor housing or wheel by a hinge allowing the actuator to rotate through an angle in response to opposing rotational forces to mitigate undesired contact of the actuator with the compressor housing interior.

26. The device of claim 15 further comprising multiple stationary magnetic elements mounted on the stationary member of the vehicle wheel assembly wherein the compressor transits the magnetic fields produced by each magnetic element during each revolution of the wheel, wherein transit of each magnetic field drives the same one of the input and output strokes, the other of the input and output strokes occur as the compressor moves intermediate the magnetic elements, the alternating intake and output strokes causing the chamber volume to increase and decrease multiple times during one wheel revolution.

27. The device of claim 15 wherein the actuator is magnetized and an arrangement of stationary magnetic elements that produce successive magnetic fields of opposite magnetic polarity causing alternating attractive and repulsive magnetic forces on the magnetized actuator as it transits the fields during each revolution of the wheel.

28. The device of claim 15 wherein the force driving the output stroke produces a maximum pressure in the compressor's output port that can exceed the minimum desired tire pressure and does not exceed the maximum desired tire pressure.

29. The device of claim 15 further comprising a pressure relief mechanism in the output port is in fluid communication with the output port and the atmosphere, the pressure relief mechanism being operative to release air from the output port to the atmosphere when the output pressure exceeds the maximum desired tire pressure.

30. The devices of claim 28 wherein a means for restricting the maximum output pressure of the compressor permits manual adjustment of the maximum output pressure to the desired tire pressure.

31. The device of claim 28 wherein a means for limiting the output pressure of the compressor varies the maximum output pressure as a function of temperature.

32. The device of claim 15 wherein the magnetic element is an electromagnet controlled by a central controller on the vehicle frame that may direct electrical current from a vehicle source to activate the electromagnet on each wheel assembly to produce the magnetic field and the first opposing force on the actuator, the electromagnet being activated only during periods when the compressor is transiting the location of the magnetic field to save electrical energy.

33. The device of claim 32 wherein the actuator is a permanent magnet and the electromagnet produces successive magnetic fields of opposite polarity by reversing current thereby producing alternating first and second attractive and repulsive opposing forces on the permanent magnet actuator such that successive transits by the actuator through the reversing field produce alternating first and second attractive and repulsive opposing forces on the permanent magnet actuator without a second source of opposing force on the actuator.

34. The device of claim 32 wherein at least one electrical coil is mounted on the wheel in magnetic communication with the stationary magnetic element while transiting the magnetic field during each wheel revolution, voltage variations being induced in the coil by changing magnetic flux linkages due to; motion of the coil through the field, and by current changes in the electromagnet; thereby performing at least one of the following functions of an electric transformer whose core is split into stationary and rotating parts; 1) transferring pulse coded data in one or both directions between primary and secondary windings, and 2) transferring electrical power from the stationary primary winding to a rotating secondary winding and from there to a rechargeable electric storage device on the wheel to be stored until used by an electronic power supply.

35. The device of claim 34 wherein stored electric energy from the rechargeable storage device and power supply on the wheel is applied to an electric coil in the compressor acting as an electromagnet to drive the second of the two opposing forces on the actuator after completion of the first of the two opposing forces by transiting the magnetic field, where a second opposing force of opposite magnetic polarity to the first opposing force is applied to the actuator by the coil in the compressor, which force can also be electrically controlled to revise the desired tire pressure and produce a pressure to exceed the revised minimum desired tire pressure and never exceed the revised maximum desired tire pressure.

36. The device of claim 34 wherein stored electric energy in the rechargeable storage device is converted by an electronic power supply to a form to support other on-wheel functions related to maintaining tire pressure, including at least one of the following:
   a. Tire Pressure Monitoring System (TPMS) functions of pressure sensing, temperature sensing, transmission to a central controller of sensor data and warnings of low tire pressure or tire pressure leaks;
   b. sense a duration of compressor operation and report a suspected leak to the driver;
   c. support an on-wheel controller that exchanges pulse coded data with a central controller on the vehicle;
   d. activate and deactivate the compressor as needed to maintain the desired tire pressure; and
   e. support an on-wheel controller that exchanges pulse coded data with a central controller on the vehicle.

37. The device of claim 15 wherein a first opposing force is applied as the actuator approaches the magnetic field and the second opposing force is applied as the actuator departs the magnetic field.

* * * * *